US009652014B2

(12) United States Patent
Warwick et al.

(10) Patent No.: US 9,652,014 B2
(45) Date of Patent: May 16, 2017

(54) ELECTRICAL ENERGY MANAGEMENT AND MONITORING SYSTEM, AND METHOD

(71) Applicant: Norman R. Byrne, Ada, MI (US)

(72) Inventors: Timothy J. Warwick, Sparta, MI (US); Gerald N. Vander Till, Grandville, MI (US); Matthew J. Simms, Grand Rapids, MI (US); Roger D. Burdi, Grand Rapids, MI (US)

(73) Assignee: Norman R. Byrne, Ada, MI (US)

( * ) Notice: Subject to any disclaimer, the term of this patent is extended or adjusted under 35 U.S.C. 154(b) by 659 days.

(21) Appl. No.: 13/794,936

(22) Filed: Mar. 12, 2013

(65) Prior Publication Data

US 2013/0238153 A1 Sep. 12, 2013

Related U.S. Application Data

(60) Provisional application No. 61/609,648, filed on Mar. 12, 2012.

(51) Int. Cl.
*G06F 1/32* (2006.01)
*H02J 13/00* (2006.01)
*H02J 3/14* (2006.01)

(52) U.S. Cl.
CPC ............ *G06F 1/32* (2013.01); *H02J 13/0062* (2013.01); *H02J 13/0079* (2013.01);
(Continued)

(58) Field of Classification Search
CPC ..... G06F 1/32; H02J 13/0079; H02J 13/0062; H02J 2003/143; Y04S 40/124;
(Continued)

(56) References Cited

U.S. PATENT DOCUMENTS 5,138,185 A 8/1992 Weinstock
5,572,438 A 11/1996 Ehlers et al.
(Continued)

FOREIGN PATENT DOCUMENTS

CN 201570900 9/2010
CN 101873009 10/2010
(Continued)

OTHER PUBLICATIONS

International Search Report and Written Opinion dated Jun. 26, 2013 for corresponding PCT Application No. PCT/US2013/030419.

*Primary Examiner* — Charles Kasenge
(74) *Attorney, Agent, or Firm* — Gardner, Linn, Burkhart & Flory, LLP

(57) ABSTRACT

A system and method are provided for managing electrical power consumption by individual electrical circuits in a building. The system includes a power control device in electrical communication with a multi-circuit power infeed and a multi-circuit power output, each of which includes at least two electrical conductors on separate circuits. The power control device includes respective electrical switches associated with the conductors of the power infeed and power output, an electronic communications module, and a computer processor in communication with the switches and the communications module. The processor is operable to open and close the electrical switches independently, in response to an occupancy signal and/or a trigger or scheduled event stored by the power control device. When a period of non-use is detected or anticipated, the power control device de-energizes one or more circuits, to limit unnecessary energy consumption within the system. A receptacle-level power control is also disclosed.

17 Claims, 19 Drawing Sheets

(52) U.S. Cl.
CPC ..... *H02J 2003/143* (2013.01); *Y02B 70/3216* (2013.01); *Y02B 70/3266* (2013.01); *Y02B 90/2638* (2013.01); *Y04S 20/221* (2013.01); *Y04S 20/242* (2013.01); *Y04S 40/124* (2013.01)

(58) Field of Classification Search
CPC . Y04S 20/242; Y04S 20/221; Y02B 90/2638; Y02B 70/3216; Y02B 70/3266
USPC .................................................. 700/286, 295
See application file for complete search history.

(56) References Cited

U.S. PATENT DOCUMENTS

| | | | |
|---|---|---|---|
| 5,880,677 A | 3/1999 | Lestician | |
| 6,184,483 B1 | 2/2001 | Coudert et al. | |
| 6,552,888 B2 | 4/2003 | Weinberger | |
| 6,642,852 B2 | 11/2003 | Dresti et al. | |
| 6,700,333 B1 | 3/2004 | Hirshi et al. | |
| 6,813,525 B2 | 11/2004 | Reid et al. | |
| 6,870,463 B2 | 3/2005 | Dresti et al. | |
| 6,993,417 B2 * | 1/2006 | Osann, Jr. | 700/291 |
| 7,022,914 B1 * | 4/2006 | Kiely | 248/56 |
| 7,058,524 B2 | 6/2006 | Hayes et al. | |
| 7,171,461 B2 | 1/2007 | Ewing et al. | |
| 7,184,848 B2 | 2/2007 | Krzyzanowski et al. | |
| 7,192,289 B2 | 3/2007 | Kowalski | |
| 7,219,243 B2 | 5/2007 | Lim | |
| 7,253,732 B2 * | 8/2007 | Osann, Jr. | 340/541 |
| 7,269,521 B2 | 9/2007 | Hsu et al. | |
| 7,380,142 B2 | 5/2008 | Lee et al. | |
| 7,409,270 B2 | 8/2008 | Schibli et al. | |
| 7,424,569 B2 | 9/2008 | Matsuda | |
| 7,463,124 B2 | 12/2008 | DiSalvo et al. | |
| 7,497,273 B2 | 3/2009 | Schoettle | |
| 7,504,745 B2 | 3/2009 | Lee | |
| 7,555,365 B2 | 6/2009 | Bhakta | |
| 7,576,448 B2 | 8/2009 | Goodrich | |
| 7,622,822 B2 | 11/2009 | Gelonese | |
| 7,765,416 B2 | 7/2010 | Zhou | |
| 7,772,717 B2 * | 8/2010 | Kitamura et al. | H01R 25/006 307/31 |
| 7,800,252 B2 | 9/2010 | DuBose et al. | |
| 7,840,383 B2 | 11/2010 | Wang | |
| 7,905,749 B2 | 3/2011 | Cleveland | |
| 7,964,989 B1 | 6/2011 | Puschnigg et al. | |
| 7,965,174 B2 | 6/2011 | Wong et al. | |
| 7,978,447 B2 | 7/2011 | Baxter | |
| 7,982,335 B2 * | 7/2011 | Aldag | H01R 25/142 307/11 |
| 8,058,552 B2 | 11/2011 | Kruse et al. | |
| 8,093,751 B1 | 1/2012 | Puschnigg et al. | |
| 8,108,695 B2 | 1/2012 | Love | |
| 8,138,626 B2 | 3/2012 | Jonsson et al. | |
| 8,140,279 B2 | 3/2012 | Subbloie | |
| 8,255,090 B2 | 8/2012 | Frader-Thompson et al. | |
| 8,265,776 B2 * | 9/2012 | Osann, Jr. | 700/22 |
| 8,275,561 B2 | 9/2012 | Alles | |
| 8,277,254 B2 * | 10/2012 | Yamamoto et al. | H01R 25/006 398/140 |
| 8,305,737 B2 | 11/2012 | Ewing et al. | |
| 8,335,936 B2 | 12/2012 | Jonsson et al. | |
| 8,374,729 B2 | 2/2013 | Chapel et al. | |
| 8,384,249 B2 | 2/2013 | Elberbaum | |
| 8,396,608 B2 | 3/2013 | Subbloie | |
| 8,415,826 B2 | 4/2013 | Lee | |
| 8,427,007 B2 | 4/2013 | Jansma et al. | |
| 8,604,914 B2 | 12/2013 | Clarke | |
| 8,622,756 B2 | 1/2014 | Smed | |
| 8,798,801 B2 | 8/2014 | Subbloie | |
| 2003/0050737 A1 * | 3/2003 | Osann, Jr. | 700/276 |
| 2005/0184867 A1 * | 8/2005 | Osann | 340/539.25 |
| 2006/0250745 A1 * | 11/2006 | Butler et al. | 361/160 |
| 2006/0271314 A1 | 11/2006 | Hayes | |
| 2007/0115695 A1 | 5/2007 | Lou et al. | |
| 2007/0155349 A1 * | 7/2007 | Nelson | H02J 13/0013 455/128 |
| 2008/0015740 A1 * | 1/2008 | Osann | 700/276 |
| 2008/0024605 A1 * | 1/2008 | Osann | 348/143 |
| 2008/0164768 A1 | 7/2008 | Litwack | |
| 2008/0175256 A1 | 7/2008 | Binder | |
| 2009/0045803 A1 | 2/2009 | Schoettle | |
| 2009/0058185 A1 | 3/2009 | Schoettle | |
| 2009/0234512 A1 | 9/2009 | Ewing et al. | |
| 2009/0261661 A1 | 10/2009 | Finneran | |
| 2009/0267420 A1 | 10/2009 | Kristensen | |
| 2009/0323257 A1 | 12/2009 | Sarid et al. | |
| 2010/0070217 A1 | 3/2010 | Shimada | |
| 2010/0079001 A1 | 4/2010 | Lee et al. | |
| 2010/0085894 A1 | 4/2010 | Johnson et al. | |
| 2010/0096925 A1 | 4/2010 | Lee et al. | |
| 2010/0145542 A1 | 6/2010 | Chapel et al. | |
| 2010/0152912 A1 | 6/2010 | Huang | |
| 2010/0191487 A1 | 7/2010 | Rada et al. | |
| 2010/0214109 A1 | 8/2010 | Reynolds et al. | |
| 2010/0225167 A1 | 9/2010 | Stair et al. | |
| 2010/0238003 A1 | 9/2010 | Chan | |
| 2010/0256828 A1 | 10/2010 | Wang | |
| 2010/0280774 A1 | 11/2010 | Ewing et al. | |
| 2010/0305773 A1 | 12/2010 | Cohen | |
| 2010/0314226 A1 | 12/2010 | Patel et al. | |
| 2010/0314942 A1 | 12/2010 | Talkin et al. | |
| 2010/0328849 A1 | 12/2010 | Ewing et al. | |
| 2011/0012427 A1 | 1/2011 | Craig et al. | |
| 2011/0015795 A1 | 1/2011 | Boyer et al. | |
| 2011/0022289 A1 | 1/2011 | Hofbauer | |
| 2011/0031806 A1 | 2/2011 | Altonen et al. | |
| 2011/0072289 A1 | 3/2011 | Kato | |
| 2011/0100702 A1 | 5/2011 | Hayes et al. | |
| 2011/0101777 A1 | 5/2011 | Jansma | |
| 2011/0109301 A1 * | 5/2011 | Johnson | H01R 13/6633 324/119 |
| 2011/0119515 A1 | 5/2011 | Sadwick et al. | |
| 2011/0121660 A1 | 5/2011 | Azancot et al. | |
| 2011/0163600 A1 | 7/2011 | Garb et al. | |
| 2011/0166710 A1 | 7/2011 | Kordik et al. | |
| 2011/0182012 A1 | 7/2011 | Hilton et al. | |
| 2011/0184581 A1 | 7/2011 | Storch et al. | |
| 2011/0185194 A1 | 7/2011 | Lin et al. | |
| 2011/0185198 A1 | 7/2011 | Ukita et al. | |
| 2011/0185303 A1 | 7/2011 | Katagi et al. | |
| 2011/0202193 A1 | 8/2011 | Craig et al. | |
| 2011/0231320 A1 | 9/2011 | Irving | |
| 2011/0282497 A1 | 11/2011 | Josephson et al. | |
| 2012/0010833 A1 | 1/2012 | Alro | |
| 2012/0059529 A1 | 3/2012 | Marivoet et al. | |
| 2012/0078670 A1 | 3/2012 | Yamamura et al. | |
| 2012/0080949 A1 | 4/2012 | Gelonese | |
| 2012/0086562 A1 | 4/2012 | Steinberg | |
| 2012/0089263 A1 | 4/2012 | Park et al. | |
| 2012/0096291 A1 | 4/2012 | Guang | |
| 2012/0109395 A1 | 5/2012 | Finch et al. | |
| 2012/0127637 A1 | 5/2012 | Byrne | |
| 2012/0128078 A1 | 5/2012 | Billingsley et al. | |
| 2012/0139341 A1 | 6/2012 | Jouper | |
| 2012/0265361 A1 | 10/2012 | Billingsley et al. | |
| 2012/0271471 A1 | 10/2012 | Lee et al. | |
| 2012/0278640 A1 * | 11/2012 | Caglianone | G06F 1/3231 713/323 |
| 2012/0295483 A1 * | 11/2012 | Smed | H01R 9/2408 439/620.21 |
| 2012/0303554 A1 * | 11/2012 | Osann, Jr. | 705/412 |
| 2012/0316808 A1 | 12/2012 | Frader-Thompson et al. | |
| 2013/0026853 A1 | 1/2013 | Chen et al. | |
| 2013/0058051 A1 * | 3/2013 | Casey | 361/730 |
| 2013/0073060 A1 | 3/2013 | Dawley et al. | |

(56) References Cited

U.S. PATENT DOCUMENTS

2013/0083805 A1    4/2013   Lu et al.
2013/0144453 A1    6/2013   Subbloie

FOREIGN PATENT DOCUMENTS

| CN | 101907870 | 12/2010 |
|---|---|---|
| CN | 201698189 | 1/2011 |
| WO | 2010033563 A1 | 3/2010 |

\* cited by examiner

ELECTRICAL ENERGY MANAGEMENT AND MONITORING SYSTEM, AND METHOD

CROSS REFERENCE TO RELATED APPLICATION

The present application claims the benefit of U.S. provisional application, Ser. No. 61/609,648, filed Mar. 12, 2012, which is hereby incorporated herein by reference in its entirety.

FIELD OF THE INVENTION

The present invention relates generally to electrical wiring and distribution systems and, more particularly, to systems for reducing unnecessary electrical energy consumption.

BACKGROUND OF THE INVENTION

Many work areas and buildings are only occupied during a portion of each day, during which time the consumption of electricity or other forms of energy (e.g. natural gas, etc.) are typically at their highest. However, significant energy may still be consumed during periods of little or no use of the building or work area. For example, even when computers, monitors, radios, and similar devices are switched off, they still consume power in "standby" mode. Also, lights, space heaters, fans, and other devices that are left on during periods of non-use can consume significant amounts of energy, thus driving up utility costs.

SUMMARY OF THE INVENTION

The present invention provides an electrical power management system and method that allows circuit-level control of power consumption in work areas or the like, based on occupancy detection and/or a predefined program that de-energizes individual circuits according to anticipated periods of non-use. This permits individual circuits, or even individual electrical outlets or power consumers, to be selectively de-powered during periods of actual or anticipated non-use of an area associated with those circuits, to limit or prevent unnecessary energy consumption by energy consumers (e.g., lights, appliances, and the like) on specific circuits.

According to one aspect of the invention, an electrical power management system includes a power control device in electrical communication with a multi-circuit powered infeed and a multi-circuit powered output. The power control device is operable to selectively control which circuits, of those that pass through the control device, are energized at a given time. The multi-circuit power infeed includes at least first and second electrical conductors on separate circuits, while the multi-circuit power output also includes first and second electrical conductors that are associated with the separate circuits of the power infeed. The power control device includes first and second electrical switches associated with the first and second conductors, an electronic communications module, and a computer processor in communication with the switches and the communications module. Each of the switches is operable, in response to the computer processor, between a closed configuration and an open configuration and to selectively connect and disconnect the conductors of the power infeed relative to the corresponding conductors of the power output. The computer processor is operable to open and close each of the electrical switches, independently of one another, in response to either or both of (i) an occupancy signal received via the electronic communications module, and (ii) a trigger or programmed event detected by the computer processor. An electrical power outlet is in electrical communication with one of the electrical conductors of the power output, and is configured to receive an electrical plug of an electrical consumer or device. The power control device can selectively provide electricity to the power outlet and the electrical consumer when the corresponding electrical switch is closed.

Optionally, the power control device further includes a memory module that is in communication with the computer processor. The memory module can store a program and/or a trigger event. The computer processor is operable to open and close the first and second electrical switches in response to the trigger event or program stored in the memory module. For example, the trigger event may be a particular time of day and/or date at which one or more switches should be opened or closed according to the expected occupancy or non-occupancy of an area in which the device is operated.

Optionally, the signal received via the electronic communications module of the power control device is an occupancy signal indicative of whether a corresponding area is occupied by a person. The occupancy signal is generated by an occupancy detector, such as a motion sensor, heat detector, or the like, which transmits the occupancy signal to the electronic communications module of the power control device.

The electronic communications module may be in communication with a computer having a display, and the electronic communications module is configured to receive program instructions from the computer. The program instructions typically include one or more trigger events, such as the time of day, and day of the week, that each switch should be closed or opened to selectively energize or de-energize a given circuit.

According to another aspect of the invention, an electrical power management system includes a power infeed with at least first and second electrical infeed conductors disposed in a flexible armored infeed conduit, a multi-circuit power output, a power control device, an electrical junction box, and an electrical power outlet. The multi-circuit power output includes first and second electrical output conductors associated with electrically separate circuits and disposed in a flexible armored output conduit. The power control device is in electrical communication with the multi-circuit power infeed and the multi-circuit power output, the power control device including first and second electrical switches associated with the first and second electrical output conductors and operable between an open configuration and a closed configuration to permit selective electrical coupling of the first and second electrical output conductors to at least one of the first and second electrical infeed conductors. The electrical junction box is positioned along the flexible armored output conduit of the multi-circuit power output. The electrical power outlet is positionable at the electrical junction box and configured to receive an electrical plug of an electrical consumer. The electrical power outlet is in electrical communication with the first electrical output conductor when the electrical power outlet is coupled to the electrical junction box to selectively provide electricity to the power outlet and the electrical consumer when the first electrical switch is closed.

According to another aspect of the invention, an electrical power management system includes an electrical receptacle in electrical communication with at least one circuit of a multi-circuit power infeed having at least two electrical infeed conductors on separate circuits. The electrical receptacle includes a computer processor, a real-time clock associated with the computer processor, at least one hot electrical contact and at least one neutral electrical contact, an electrical relay, and electronic communications module. The hot and neutral electrical contacts are configured to receive respective contacts of an electrical plug associated with an electrical consumer. The electrical relay is operable to selectively energize the hot electrical contact in response to a signal received from the computer processor in response to at least one of (i) an occupancy signal received via the electronic communications module and (ii) a trigger event detected by the computer processor. The electronic communications module is in communication with a remote computer having a display, and is configured to receive program instructions from the remote computer, where the program instructions include one or more of the trigger events.

According to another aspect of the invention, a method is provided for controlling the distribution of electrical power among a plurality of circuits in an electrical system. The method includes electrically coupling a multi-circuit power infeed to a power control device, the power control device including first and second electrical switches associated with first and second electrical conductors of the multi-circuit power infeed. The electrical switches are controlled by a computer processor of the power control device. A multi-circuit power output is electrically coupled to the power control device, wherein the multi-circuit power output includes first and second electrical conductors that are in selective electrical communication with the first and second electrical conductors of the multi-circuit power infeed according to the positions of the first and second electrical switches. An electrical power outlet is electrically coupled to one of the first and second electrical conductors of the multi-circuit power output. An occupancy signal is received via an electronic communications module, or a trigger event is detected by the computer processor. In response to receiving an occupancy signal or detecting a trigger event, either or both switches are closed or opened to thereby electrically energize or de-energize the first and second electrical conductors of the multi-circuit power output.

Optionally, a power monitor is incorporated into the power control device for measuring and logging and/or transmitting power consumption data for each circuit to another computer, such as for historical power consumption data analysis.

Therefore, the present invention provides an electrical power management system and method that allows for individual control of electrical circuits in a work area or the like, so that one or more of the circuits that service the given area may be de-energized during periods of non-use. This permits conservation of energy, substantially without affecting productivity, while also allowing for power consumption data analysis for use in optimizing power consumption within a building or work area.

These and other objects, advantages, purposes, and features of the present invention will become apparent upon review of the following specification in conjunction with the drawings.

DESCRIPTION OF THE PREFERRED EMBODIMENTS

Figure 1:
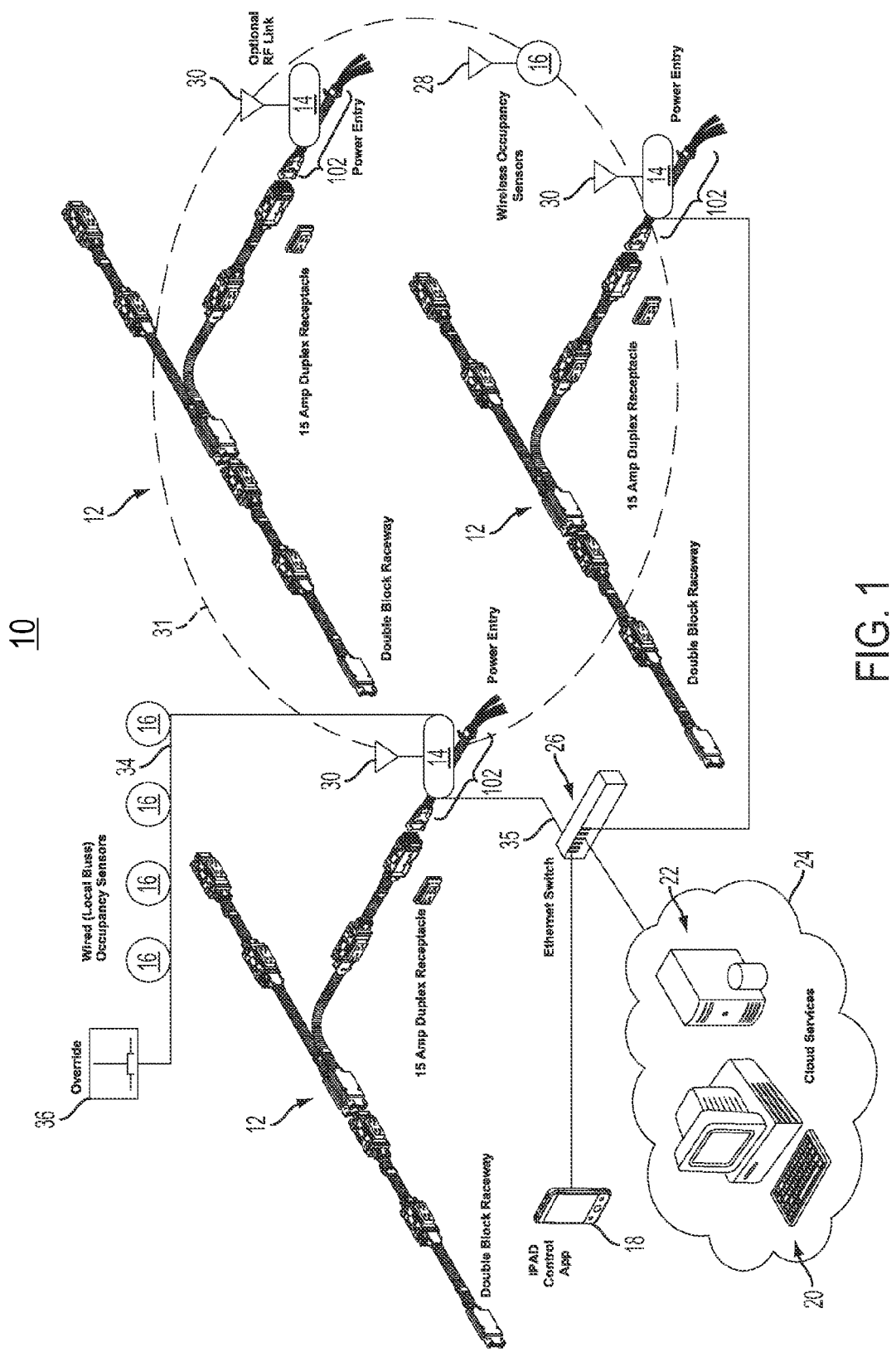
FIG. 1 is a diagram of a wired and wireless network-enabled electrical power management system in accordance with the present invention.

Referring now to the drawings of the illustrative embodiments depicted therein, an electrical power management system 10 (FIG. 1) allows a building or work area administrator, or other authorized person, to set, control, and monitor circuit-by-circuit power consumption within the system. Power management system 10 includes a plurality of multi-circuit power distribution assemblies 12, each including a respective power control device 14 in communication with a plurality of occupancy sensors 16, at least some of which are on different electrical circuits within a given assembly 12. Each power distribution assembly 12 may service a different portion of a work area, for example, and is in communication with occupancy sensors 16 and/or with a local computer 18 (typically a computer located at the same premises as power distribution assembly 12), which communicates with each power control device 14, such as to program the device in a manner that will be described in more detail below.

Each power control device 14 is operable to selectively de-energize one or more of the circuits of its respective power distribution assembly 12 in response to an occupancy signal received from occupancy sensor 16, and/or in accordance with a power control program that is uploaded to the power control device 14 from local computer 18. This allows for a selective de-energizing of particular circuits in a work area or the like, to limit or prevent unnecessary electrical consumption when a given area that is serviced by a power distribution assembly 12 is unoccupied, or when a given area is typically unoccupied, or in a period of limited use. Optionally, an occupancy signal received from occupancy sensor 16 may override a programmed instruction to open a given circuit, so that electrical power is made available for persons in a work area at non-standard times, for example.

In the illustrated embodiment of FIG. 1, electrical power management system 10 includes a remote computer 20 and/or a computer server 22, which may be operated by a third party service provider, an administrator, or the like. Remote computer 20 and server 22 can communicate with local computer 18 via Internet 24 or other computer network. For example, remote computer 20 and computer server 22 may communicate with local computer 18 and/or power control device 14 via Internet 24 and an Ethernet switch 26 and/or other network devices located on the premises of multi-circuit power distribution assemblies 12.

It will be appreciated that substantially all electronic communications within electrical power management system 10 may be conducted wirelessly, or through wired connections, or through a combination of wired and wireless communications, without departing from the spirit and scope of the present invention. For example, some occupancy sensors 16 may include wireless transmitters 28 for sending occupancy signals to a wireless receiver or communications module 30 located at power control device 14, thus forming a wireless network 31 (FIG. 1). Other occupancy sensors 16 may communicate with a wired receiver or communications module 32 of power control device 14 via dedicated wiring 34 (FIG. 1). Other wiring 35 may be provided for communications between power control device 14 and Ethernet switch 26 or other communications hardware. It will be appreciated that a given power control device 14 may include a communications module that is capable of both wired and wireless electronic communications.

Figure 2:
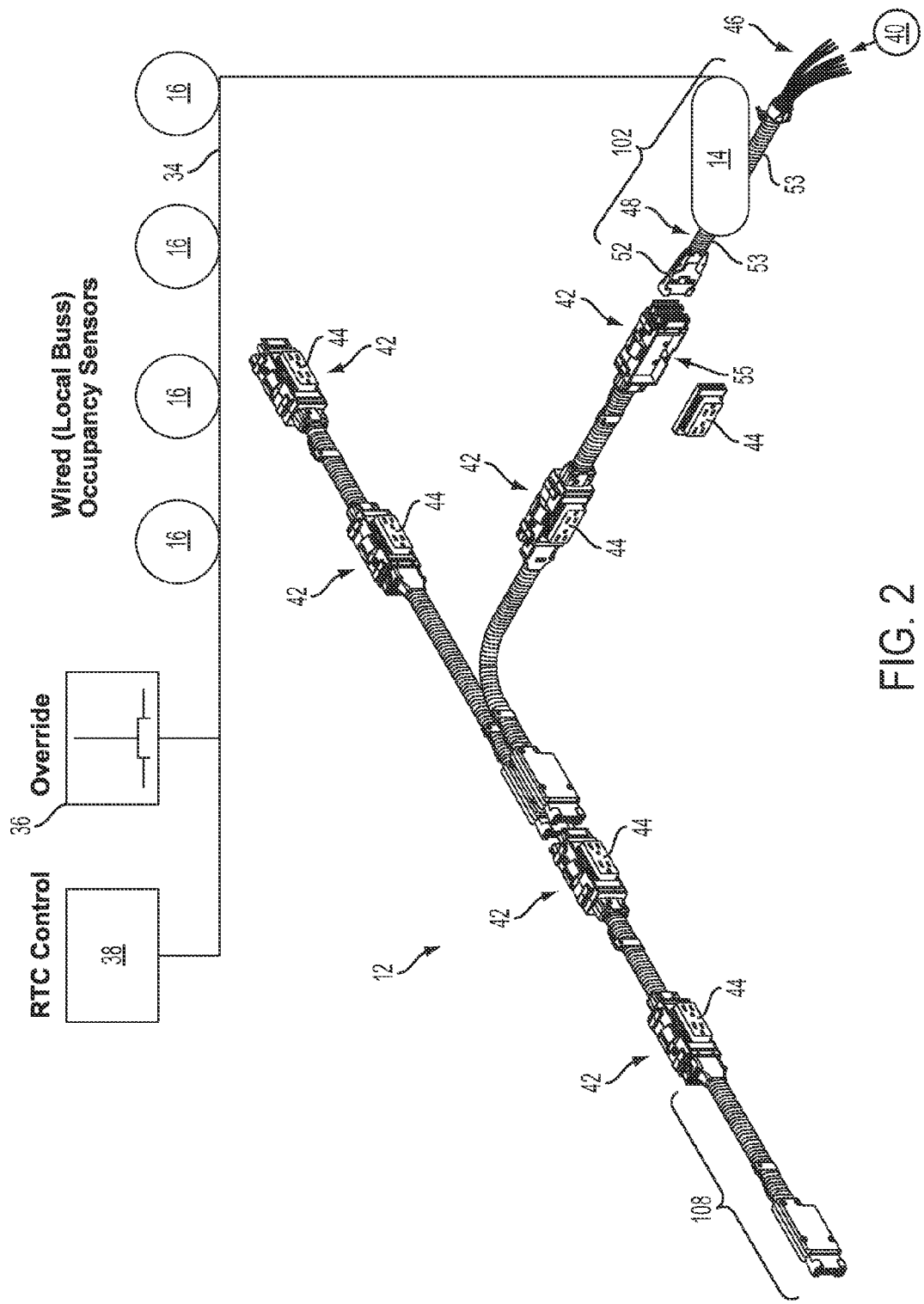
FIG. 2 is a diagram of a basic stand-alone electrical power management system in accordance with the present invention.

Optionally, a multi-circuit power distribution assembly 12 may be operated in a substantially autonomous manner in which the power control device 14 selectively energizes and de-energizes individual circuits within power distribution assembly 12 according to signals received from occupancy sensors 16 or the like, such as shown in FIG. 2. In this arrangement, power control device 14 may not be programmable by an outside device, such as local computer 18, but would generally operate in response to occupancy sensors only. In addition, an override switch 36 (FIGS. 1 and 2) may be provided, which is in communication with wiring 34 (or in wireless communication with power control device 14), so that one or more circuits within power distribution assembly 12 may be energized regardless of whether the presence of a person is detected in the area of occupancy sensors 16.

Optionally, when power control device 14 is signaled to energize one or more circuits based on signals received from occupancy sensors 16 or override switch 36, power control device 14 may be configured to de-energize the circuit or circuits after a predetermined amount of time has passed since the switch was activated, or since the last time an occupancy signal was sent by an occupancy sensor 16. Optionally, a real-time clock 38 may be associated with occupancy sensors 16 or override switch 36, so that activation of the switch or sensors can be set to "time out" after a predetermined amount of time, thus sending a signal to power control device 14 to de-energize its circuit or circuits. Power control device 14 may also incorporate a real-time clock 38 for substantially the same purpose, or for use in running the power control device 14 according to a programmed schedule, as will be described below.

Figure 3:
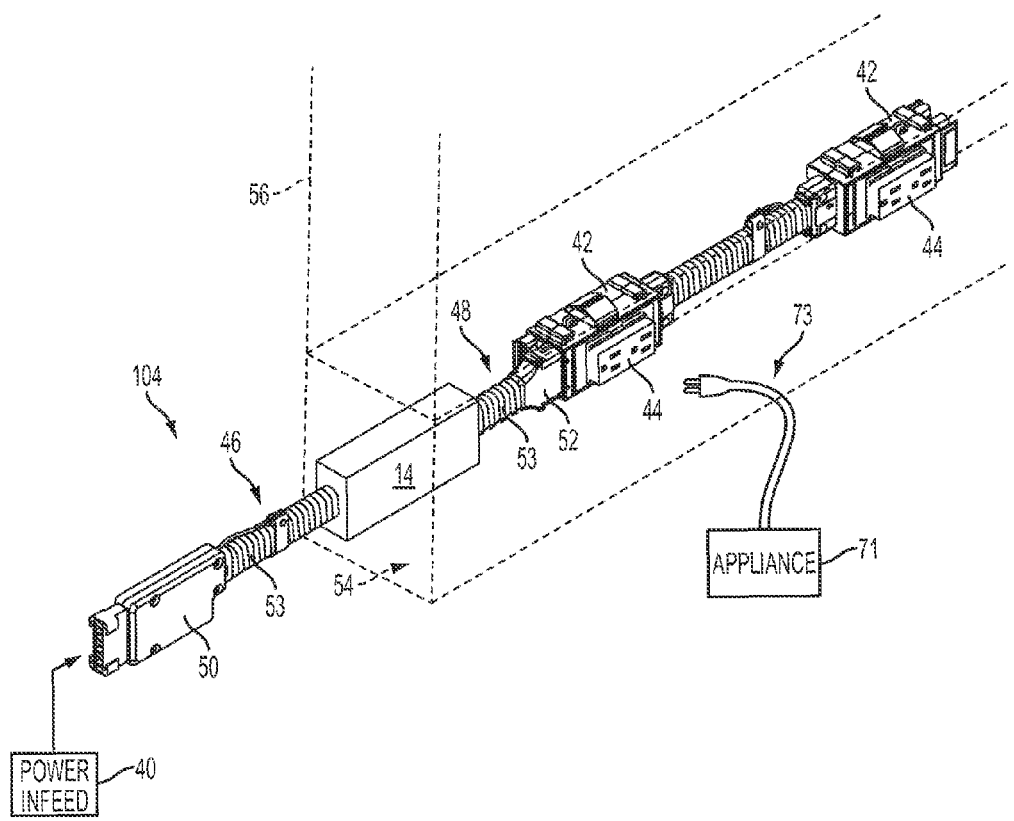
FIG. 3 is an enlarged perspective view of a portion of a multi-circuit power distribution assembly, including a power control device, shown partially disposed in a raceway of a work station divider or wall.

Power control device 14 is typically installed between a power infeed 40 and one or more junction blocks 42 having electrical power outlet receptacles 44 associated therewith (FIG. 3). Power control device 14 is electrically coupled to power infeed 40 via a plurality of bundled power infeed electrical conductors 46, and is further in electrical communication with junction blocks 42 via a plurality of bundled power output electrical conductors 48. Optionally, power infeed electrical conductors 46 are electrically coupled to power infeed 40 via an infeed connector 50, while power output electrical conductors 48 are electrically coupled to junction blocks 42 or other downstream conductors via an output connector 52. In the illustrated embodiment, power infeed electrical conductors 46 and power output conductors 48 are shielded or protected by respective flexible metal or armored conduits 53 (FIGS. 2 and 3). Junction blocks 42 define cavities 55 on their opposite sides (FIG. 2) for receiving power outlet receptacles 44. Junction blocks 42 are configured in a manner that allows a given receptacle 44 to electrically couple to one circuit when the receptacle is in a first orientation relative to junction block 42 when the receptacle is received at cavity 55, and that allows the receptacle 44 to electrically couple to a different circuit when the receptacle is in a second orientation (typically oriented 180 degrees to the first orientation) relative to the junction block 42. This is electrically illustrated in FIG. 5, for example, in which different junction blocks 42 are diagrammatically shown to permit electrical connections (by different circuits or outlet receptacles 44a-d) to different combinations of electrical conductors 48 that pass through each junction block 42. Such systems are readily available from Byrne Electrical Specialists, Inc. of Rockford, Mich., and are described in more detail in commonly-owned U.S. Pat. Nos. 5,259,787; 6,036,516; and 7,534,122, for example, which are hereby incorporated herein by reference in their entireties.

In the illustrated embodiment of FIG. 3, power control device 14, junction block 42 and power outlet receptacle 44, bundled electrical conductors 46 and 48, and connectors 50 and 52 cooperate to form a portion of a given multi-circuit power distribution assembly 12 (also shown in FIGS. 1 and 2), which is configured to be at least partially disposed in a raceway 54 defined in a wall or divider 56 or the like (FIG. 3). Although raceway 54 is shown at a lower end portion of a furniture divider or partition 56 in FIG. 3, it will be appreciated that raceway 54 may be disposed at substantially any position along the divider or wall 56, to provide power along substantially any divider or wall location. For example, the BYRNE 8-TRAC® or BYRNE 4-TRAC® electrical distribution assemblies, available from Byrne Electrical Specialists, Inc. of Rockford, Mich., are configured for such applications, and these may incorporate power control device 14 to serve as suitable multi-circuit power distribution assemblies 12. The above-referenced BYRNE 8-TRAC® and BYRNE 4-TRAC® systems are described in commonly-owned U.S. Pat. No. 7,410,379 and in commonly-owned U.S. patent application, Publication No. 2012/0064747, respectively, which are hereby incorporated herein by reference in their entireties. Optionally, a multi-circuit power distribution assembly may be positioned in a raised floor, or in raceways provided above a ceiling, without departing from the spirit and scope of the present invention.

Figure 4:
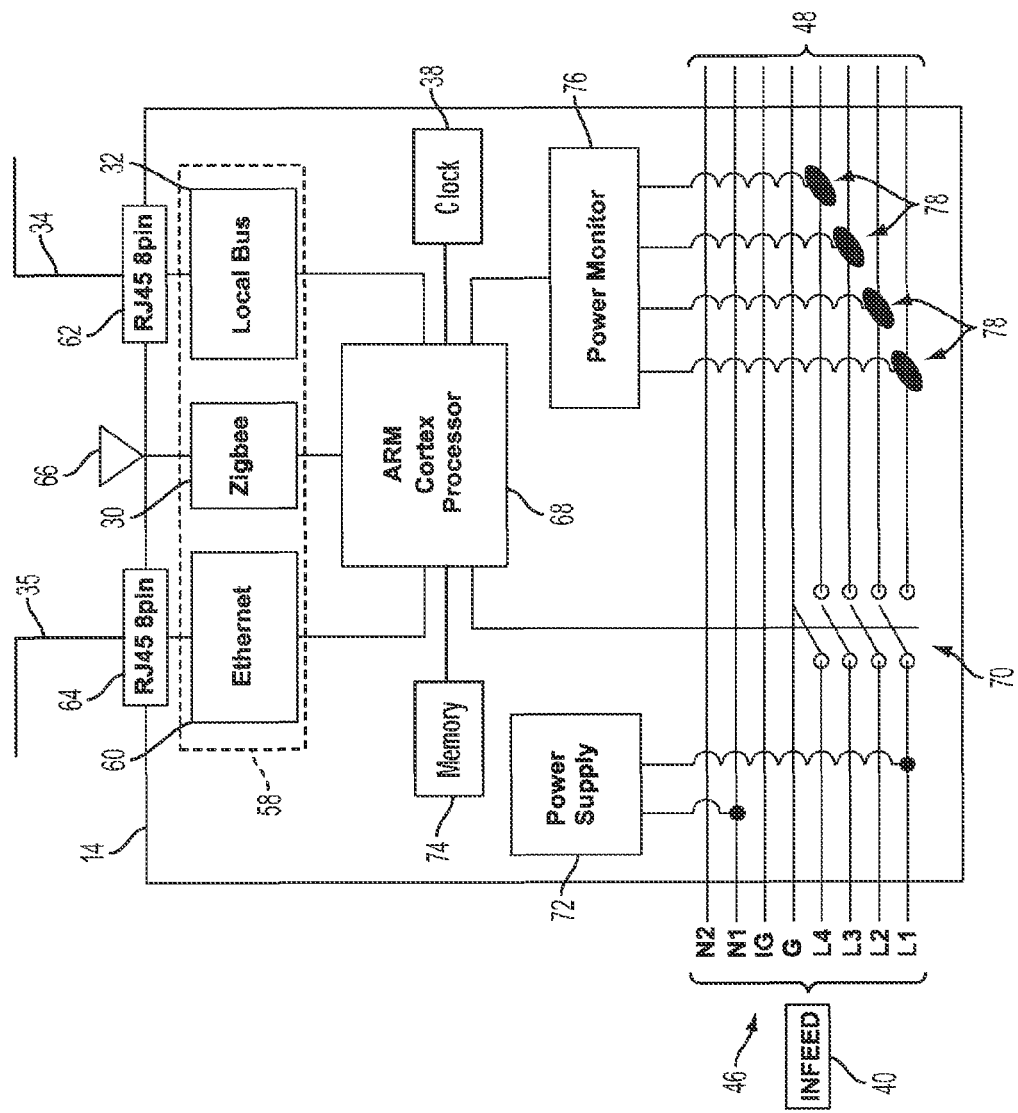
FIG. 4 is a wire diagram of a four-circuit version of the power control device of FIG. 3.

Power control device 14 includes an electronic communications module 58 which, in the illustrated embodiment of FIG. 4, includes a wired receiver or "local bus" 32, an Ethernet transceiver 60, and wireless transceiver 30 for performing electronics communications to and/or from power control device 14. Wired receiver 32 includes a standard RJ45 connector 62 or the like, for coupling to wiring 34 of occupancy sensors 16 and/or override switch 36. Ethernet transceiver 60 may similarly include a 10/100 Ethernet port (RJ45 connector) 64 or the like, for wired communications with Ethernet switch 26 via wiring 35. Wireless receiver 30 includes a transceiver antenna 66 to facilitate wireless communications between power control device 14 and wireless occupancy sensors 16, local computer 18, remote computer 20 and server 22, or the like. For example, wireless receiver 30 may be a transceiver operating under 2.4 GHz ZIGBEE® protocol, BLUETOOTH® protocol, or substantially any other wireless communications protocol.

In the illustrated embodiment of FIG. 4, electronic communications module 58 includes wired receiver 32, wireless receiver 30, and Ethernet transceiver 60, all of which are in electronic communication with a computer processor 68 in power control device 14. However, it will be appreciated that, depending on the need for a particular application, one or two of wireless receiver 30, wired receiver 32, and Ethernet transceiver 60 may be omitted, thus providing reduced communications capability, but still providing limited functionality. For example, in the illustrated embodiment of FIG. 2, power control device 14 may include only wired receiver 32 for communication with occupancy sensors 16 and override switch 36, in which case the power control device may lack the ability to communicate with another computer, for example.

Control device 14 further includes a plurality of electrical switches 70, such as electrical relays or the like, each of which corresponds to a respective "hot" conductor among the power infeed electrical conductors 46 (FIG. 4). For example, in the illustrative embodiment of FIG. 4, there are four electrically hot conductors (L1-L4), each part of a distinct electrical circuit that enters power control device 14 from power infeed conductors 46. Each electrically hot conductor L1-L4 feeds into a respective one of electrical switches 70, which are independently operable between an open configuration (as shown in FIG. 4) and a closed configuration in response to a signal received from computer processor 68. In addition to the electrically hot conductors L1-L4, power infeed electrical conductors 46 include two neutral conductors N1, N2 and two ground conductors G, IG that pass unbroken through power control device 14 and continue through to power output electrical conductors 48.

A power supply 72 is electrically coupled to hot conductor L1 and neutral conductor N1 in power control device 14, regardless of whether any of switches 70 are open, such as shown in FIG. 4. Power supply 72 draws power from power infeed 40 and supplies the electrical power needs of power control device 14. Power supply 72 may include a battery and/or an AC/DC power inverter. A memory module 74 is in communication with computer processor 68, and allows the processor to store triggered events such as a time-based program schedule defining times at which the circuits associated with hot conductors L1-L4 will be de-energized or re-energized by changing the position of the individual electrical switches 70. A real-time clock 38 may be incorporated into power control device 14 for use in operating time-based functions. Optionally, a power monitor module 76 is in communication with computer processor 68, and is individually electrically coupled using inductive couplers 78 at each of the electrically hot conductors L1-L4 of the power output electrical conductors 48 using known techniques, to individually monitor, track, and report real time power consumption and/or historical power consumption data for the individual circuits associated with hot conductors L1-L4.

Figure 5:
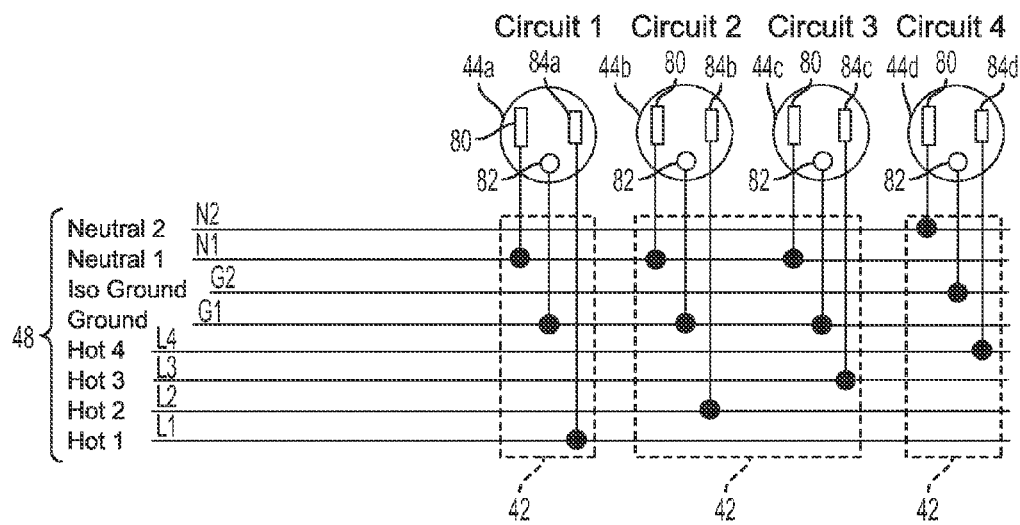
FIG. 5 is a wire diagram of the power output end portion associated with the power control device of FIG. 4.

Referring now to FIG. 5, the four hot conductors L1-L4 of power output conductors 48 are (or are configured to be) electrically coupled to electrical consumers via electrical connections represented by power outlet receptacles 44*a-d*, which are also identified as "Circuit 1", "Circuit 2", "Circuit 3", and "Circuit 4" in FIG. 5. Each of power outlet receptacles 44*a-d* represents at least one power outlet receptacle for a potential power consumer (appliance, computer, lighting, power outlet, or the like), or represents a potential power consumer itself, which may draw power from one of the circuits passing through power control device 14. For example, first power outlet receptacle 44*a* may represent a plurality of power outlet receptacles at the floor level of a work area, which are primarily for powering computers, computer monitors, and peripheral devices; while second power outlet receptacle 44*b* may represent a plurality of power outlet receptacles at a work surface level of the work area, which may be primarily intended for powering chargers, fans, pencil sharpeners, radios, etc.; while third power outlet receptacle 44*c* may represent area lighting provided at individual workstations; and fourth power outlet receptacle 44*d* may represent an unused circuit that is available for later use, if desired.

Optionally, and by further example, each of power outlet receptacles 44*a-d* may represent a separate electrical circuit that provides power to a respective one of four individual workstations, so that each workstation (including computers, monitors, area lighting, peripheral devices, etc.) is powered by a respective one of Circuits 1-4. In this latter example, it may be beneficial to de-energize one individual circuit for a prolonged period, such as during a planned vacation by the person assigned to a corresponding work station, for example, in addition to regular programmed (or occupancy-based) de-energizing of the circuit.

In the illustrated embodiment of FIG. 5, each of Circuits 1-3 (represented by power outlet receptacles 44*a-c*) has one neutral conductor socket 80 that is electrically coupled to a first neutral conductor N1 of power output conductors 48, one ground conductor socket 82 that is electrically coupled to a first ground conductor G1 of power output conductors 48, and one hot conductor socket 84*a-c* that is electrically coupled to a respective one of hot conductors L1-L3 of power output conductors 48. In this way, each of the electrically isolated hot conductors L1-L3 supplies current to a respective one of Circuits 1-3, while these circuits all share a common neutral conductor N1 and a common ground conductor G.

However, Circuit 4 (represented by fourth power outlet receptacle 44d) is a fully-isolated circuit in which its neutral conductor socket 80 is electrically coupled to a second neutral conductor N2 of power output conductors 48, its ground conductor socket 82 is electrically coupled to an isolated second ground conductor G2 of power output conductors 48, and its hot conductor socket 84d is electrically coupled to hot conductor L4 of power output conductors 48. With this arrangement, power control device 14 is operable to individually de-energize any of Circuits 1-4 by opening a corresponding one of electrical switches 70 to disconnect the corresponding one of hot conductors L1-L4, while the neutral lines N1, N2 and ground lines G, IG remain in electrical contact with the corresponding neutral lines N1, N2 and ground lines G, IG of power infeed electrical conductors 46.

Figure 7A:
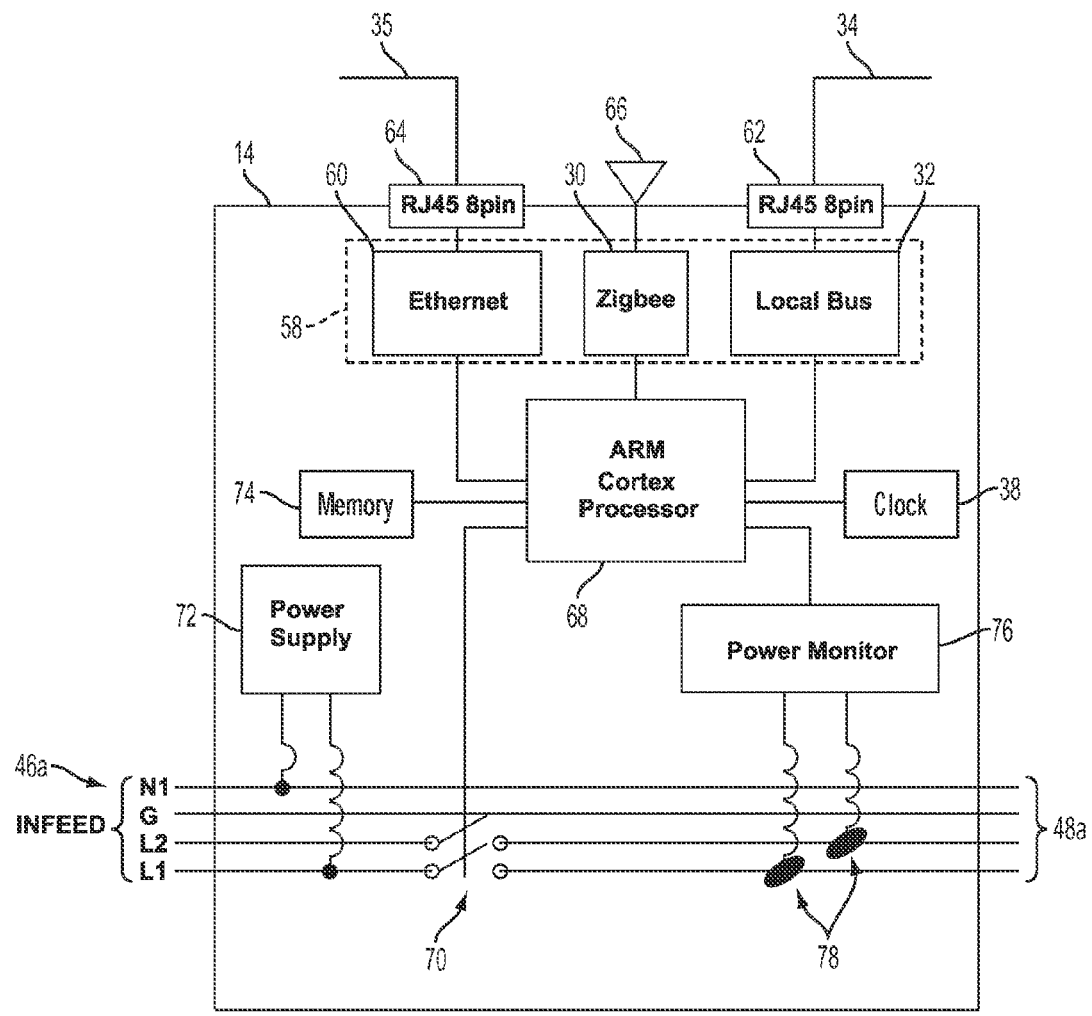
FIG. 7A is a wire diagram of a two-circuit version of the power control device.
Figure 7B:
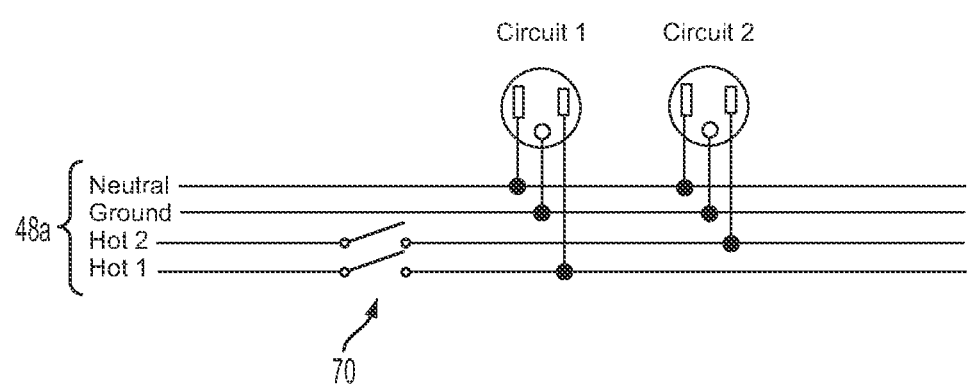
FIG. 7B is a wire diagram of a two-circuit power output associated with the two-circuit power control device of FIG. 7A.
Figure 8A:
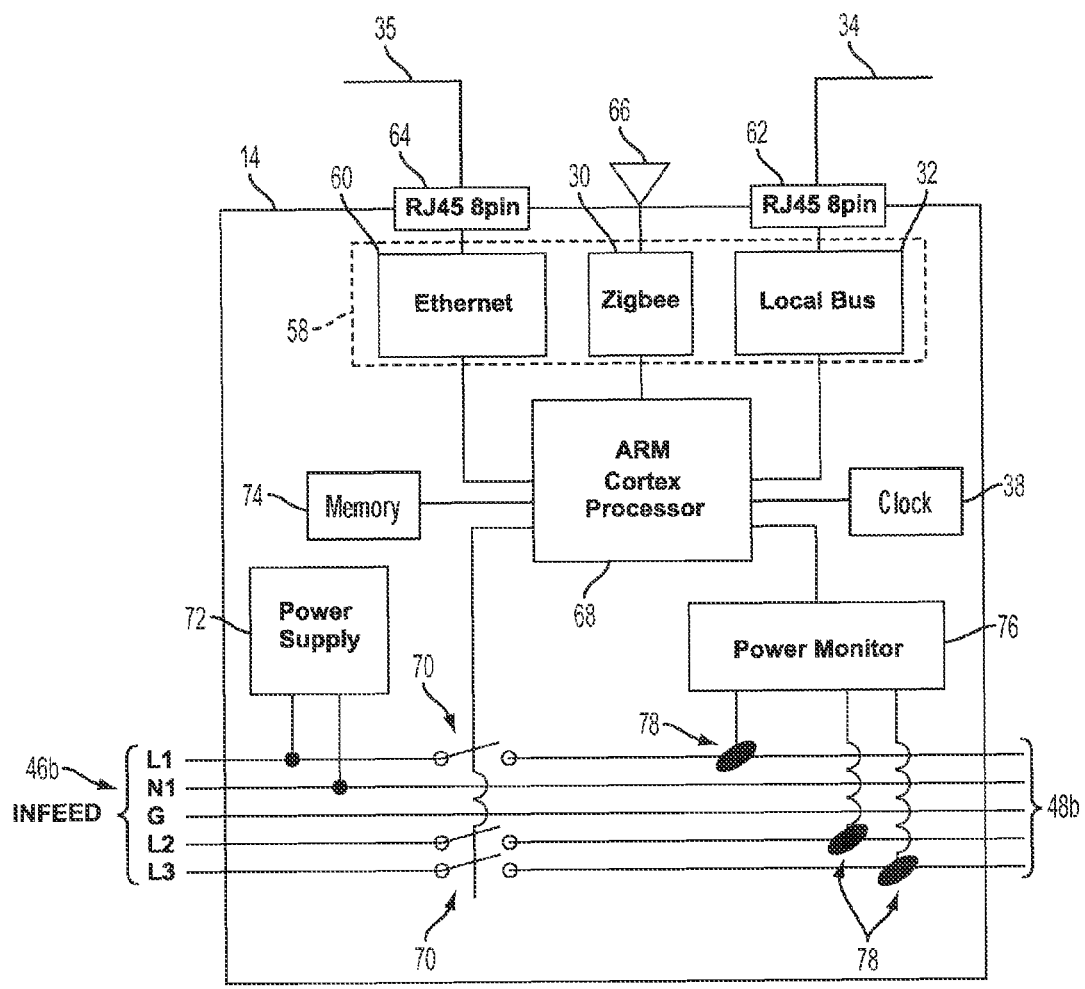
FIG. 8A is a wire diagram of a three-circuit version of the power control device.
Figure 8B:
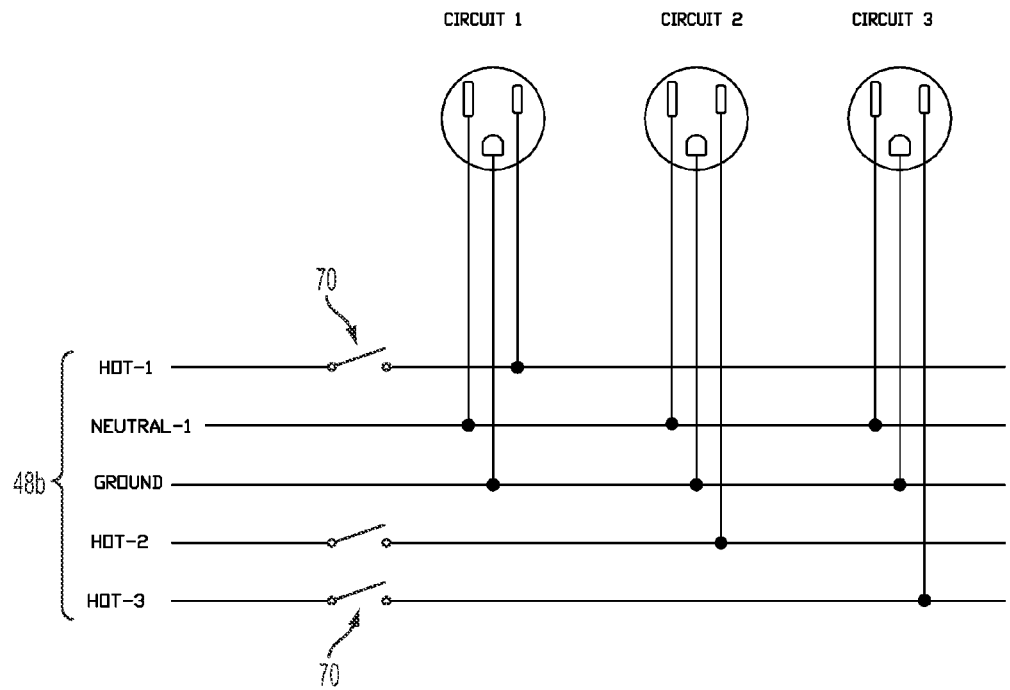
FIG. 8B is a wire diagram of a three-circuit power output associated with the three-circuit power control device of FIG. 8A.
Figure 9:
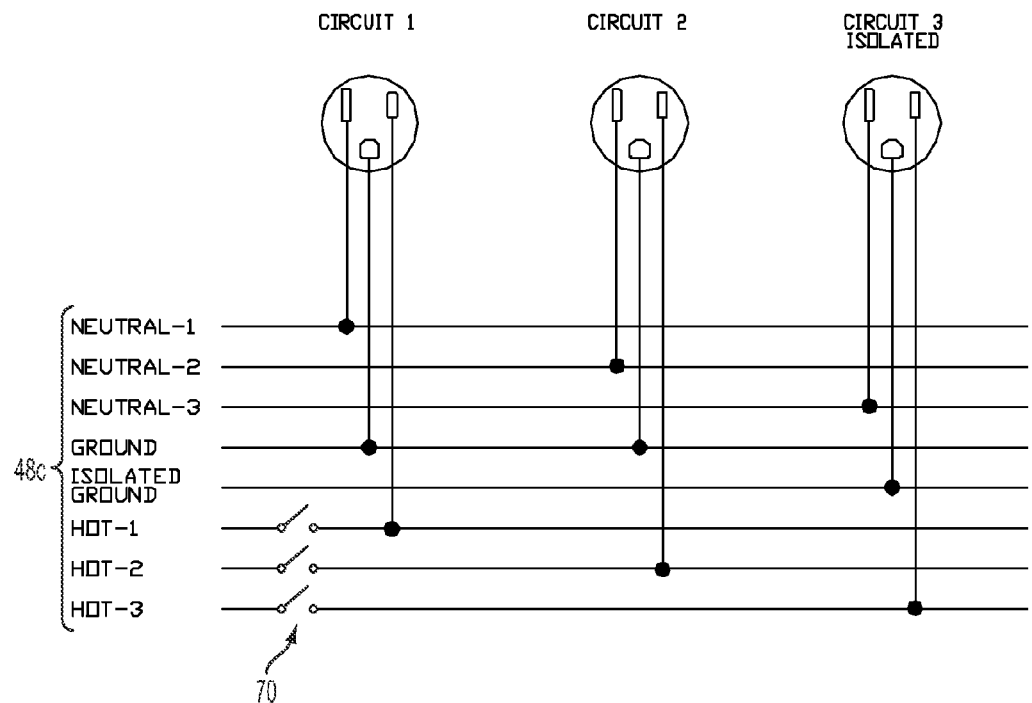
FIG. 9 is a wire diagram of another three-circuit power output that can be associated with a power control device.
Figure 10:
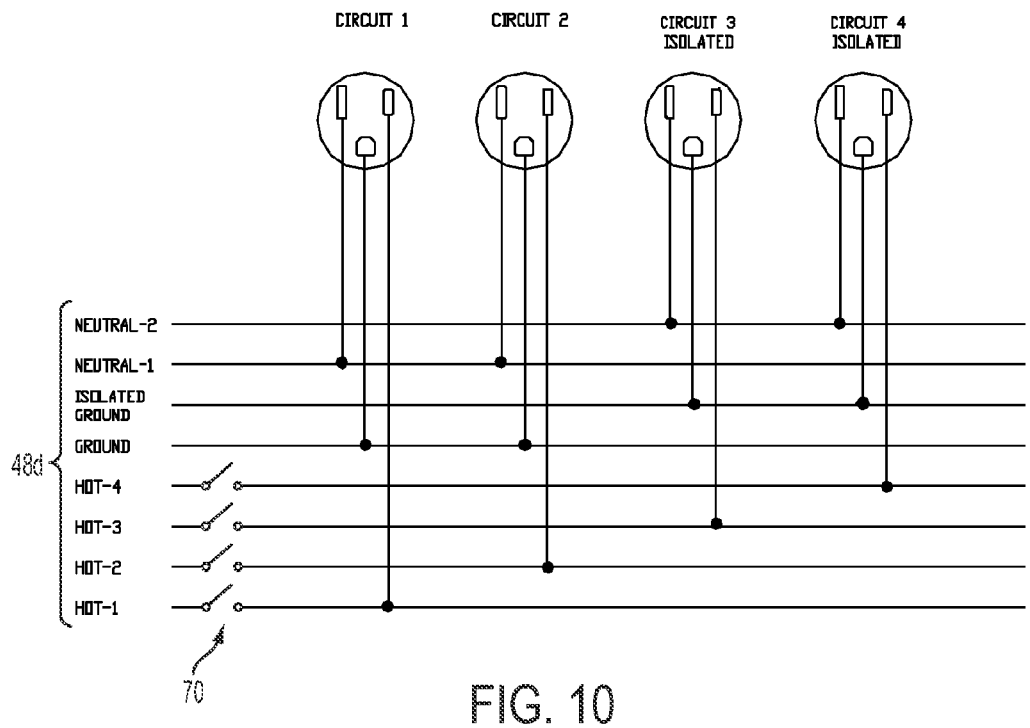
FIG. 10 is a wire diagram of another four-circuit power output that can be associated with a power control device.

It will be appreciated that power control device 14 may be adapted for use with substantially any power infeed having substantially any number of hot conductors, neutral conductors, and ground conductors, depending on the electrical needs of a given application. For example, the power control device may be in communication with a single neutral conductor, a single ground conductor, and two hot conductors of a power output 48a defining two circuits, each controlled by a respective switch 70, such as shown in FIGS. 7A and 7B. Other variations may include, for example, different three-circuit arrangements such as one having a single neutral conductor, a single ground conductor, and three hot conductors of a power output 48b, such as shown in FIGS. 8A and 8B; and one having three neutral conductors, one common ground conductor, one isolated ground conductor, and three hot conductors of a power output 48c, such as shown in FIG. 9. Other exemplary four-circuit arrangements may include one having two neutral conductors, one ground conductor used by two circuits, one isolated ground conductor used by two other circuits, and four hot conductors of a power output 48d, such as shown in FIG. 10; and one having two neutral conductors, one ground conductor used by three circuits, one isolated ground conductor used by a fourth circuit, and four hot conductors of a power output 48e, such as shown in FIG. 11.

Figure 11:
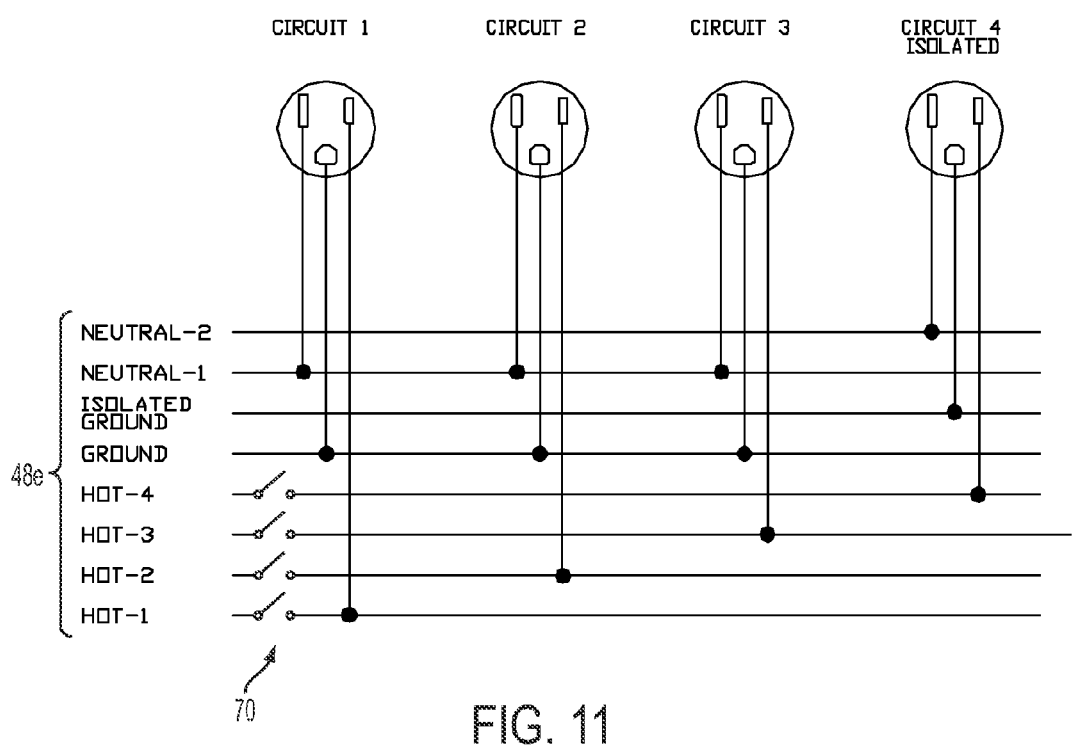
FIG. 11 is a wire diagram of another four-circuit power output that can be associated with a power control device.

All of the above-described circuit arrangements are commonly available from Byrne Electrical Specialists, Inc. of Rockford, Mich., and currently marketed as the Byrne 5-Wire System (FIG. 8), the Byrne "3-3-2" Eight-Wire System (FIG. 9), the Byrne "2+2" Eight-Wire System (FIG. 10), and the Byrne "3+D" Eight-Wire System (FIG. 11). Although switches are not illustrated in the circuits of FIGS. 9-11, it is envisioned that any of these circuits could readily be adapted to incorporate a power control device 14 having respective switches 70 on each of the hot conductors, such as shown in FIGS. 4, 7, and 8, or in substantially any other multi-circuit arrangement. Although the illustrated circuits all show one-to-one correlation of power output conductors 48 to power infeed conductors 46, it should further be appreciated that such correlation is not required. For example, a single high-capacity electrically hot conductor could be provided at the power infeed (typically in combination with an electrically neutral conductor and an electrically grounded conductor), and then split into two or three or four or more separate infeed conductors that connect to respective switches 70 to form separate circuits at the switches and electrical output conductors 48, without departing from the spirit and scope of the present invention.

Figure 6:
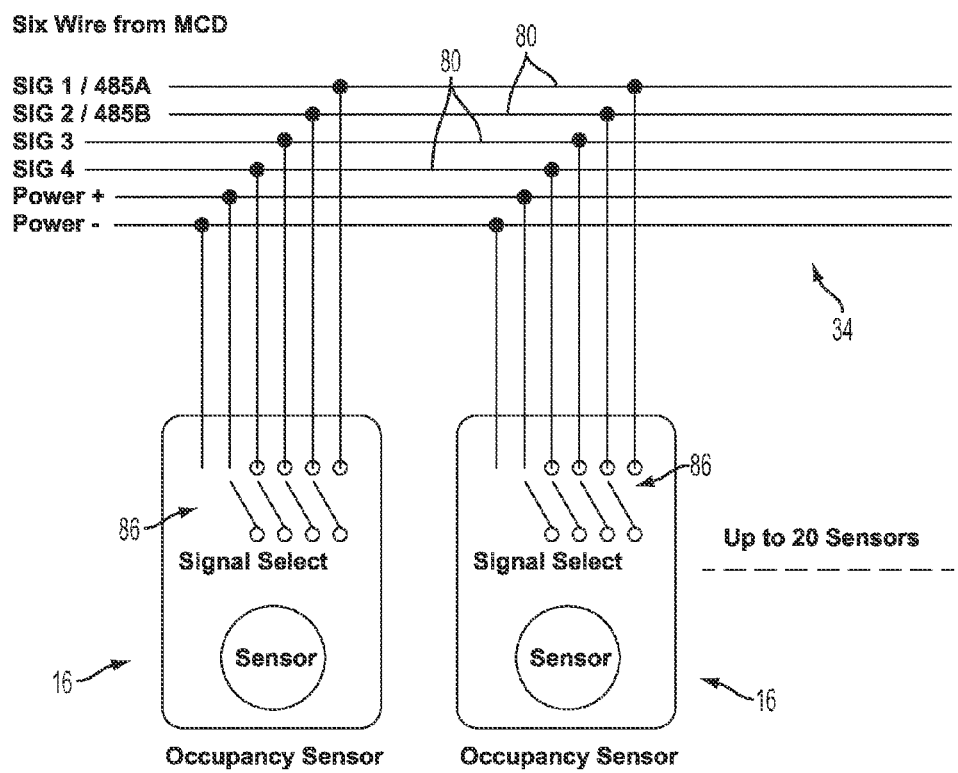
FIG. 6 is a wire diagram of a pair of wired occupancy sensors that are operable in communication with the power control device via a local bus.

Referring now to FIG. 6, an exemplary local bus wire diagram depicts an exemplary pair of wired occupancy sensors 16 that communicate with one or more power control devices 14 via wiring 34 and connector 62, such as shown in FIG. 7A. Each sensor 16 includes a plurality of internal switches 86, each of which corresponds to a respective signal conductor 88, which in turn corresponds to a respective circuit managed by power control device 14. In this way, each occupancy sensor 16 is selectable to activate any single circuit or combination of circuits by transmitting an occupancy signal to one or more power control devices 14. For example, if only office computers (on one circuit) and area lighting (on another circuit) are to be energized when a given occupancy sensor 16 detects that a particular area is occupied, then only two of switches 86 are set to close in order to signal power control device 14, through corresponding signal conductors 88, to close corresponding switches 70 to energize the selected circuits associated with the office computers and area lighting. Override switch 36 may be operated in a similar manner as wired occupancy sensors 16, but with a manual button or other type of user-actuatable switch or signaler that closes the electrical contacts associated with one or more signal conductors 88 of electrical wiring 34, and may be configured to activate any single circuit or substantially any combination of circuits within power management system 10, as desired.

In the illustrated embodiment of FIG. 6, occupancy sensors 16 may include two connectors, such as RJ45 connectors, to allow multiple sensors to be arranged in series. Sensors 16 may be a passive infrared (PIR) type, for example, of substantially any desired sensitivity and detection angle and/or distance, as is known in the art. It will be appreciated that wireless occupancy sensors can be operated in substantially the same way as wired sensors, but with wireless transmitters 28 used in place of signal conductors 88. Wireless occupancy sensors may be battery-powered, and may communicate with wireless transceiver 30 of power control device 14 via wireless transmitter 28 (FIG. 1). Optionally, the sensors 16 may include on-board real-time clocks (like clock 38) that enable the sensors to send an occupancy signal for a predetermined or selected period of time after occupancy has been detected, so that power control device will maintain the selected switch or switches 70 in a closed configuration until the occupancy signal from sensor 16 times out.

It is envisioned that electrical power management system 10 may be adapted for use in different operating environments, such as to provide fewer features where extra features or functionality are not needed, or where system cost should be reduced. For example, a full-function power management system may include power monitor 76 and inductive couplings 78, time-based circuit on/off controls, software implemented at local computer 18 for programming power control device 14, manual override switch 36, local wired bus 34, 62 for occupancy sensors 16 and override switches 36, Ethernet port 64 for wired control access to power control device 14, and wireless transceiver 30 at communications module 58. A medium-function power management system may include most features of a full-function system, but exclude circuit power monitoring (e.g. power monitor 76 and inductive couplings 78) capability, for example. A lower-function power management system may include only time-based circuit on/off controls, and a local wired bus 34, 62 for occupancy sensors 16 and override switches 36, while omitting power monitoring, and wireless communication capabilities.

Accordingly, power control device 14 is capable of individually actuating electrical switches 70 to selectively energize and de-energize individual circuits associated with hot conductors L1-L4 of power infeed electrical conductors 46. Each of the electrically hot conductors L1-L4 may be associated with a specific type of electrical consumer, such as appliances 71 having wired plugs 73 (FIG. 3) that may be plugged in to power outlet receptacles 34, or for lighting, HVAC equipment, or other types of electrical consumers serviced by power infeed 40. Power control device 14 is operable in a substantially autonomous mode in which, once a program is received in memory 74 (such as via local computer 18 and Ethernet transceiver 60), processor 68 will control the position of each electrical switch 70 based on time of day, day of week, or other parameters as defined by the program stored in memory 74. Computer processor 68 may also individually operate switches 70 in response to occupancy signals received from occupancy sensors 16 via electrical wiring 34, or via wireless transceiver 30, for example. Power control device 14 may optionally monitor power consumption of individual circuits associated with each hot conductor L1-L4, and constantly transmit the collected power consumption data via electronic communications module 58 and/or may log such data in memory module 74.

Power consumption data may be collected by processor 68 and forwarded from power control device 14 to remote computer 20 and/or server 22 for analysis and reporting purposes, for example, and can be made accessible to local computer 18, which is more closely associated with the premises at which electrical power management system 10 is installed or implemented. Remote computer 20 and server 22 (FIG. 1) represent substantially any computing system with access to memory storage, such as to facilitate "cloud computing" functions for data storage and analysis, and it should be understood that system 10 does not require a separate computer and server as shown in FIG. 1. Local computer 18 may be a desktop or laptop computer, or a hand-held portable computer that exchanges data wirelessly or through wired connections on the premises of power distribution assemblies 12, such as via Ethernet and/or WiFi implemented network(s), for example. However, it will be appreciated that local computer 18 may access the network remotely, without departing from the spirit and scope of the present invention.

In the illustrated embodiment of FIG. 1, local computer 18 is used to program power control devices 14 as desired, and can be used to monitor or control the current status of each power control device 14. It is envisioned that local computer 18 can obtain and display power consumption data received directly from each power control device 14, in addition to (or as an alternative to) obtaining power consumption data from remote computer 20. Electronic communications between local computer 18 and power control devices 14 may be implemented via open-source or proprietary communications protocols. For example, the communications modules 58 of power control devices 14 may be configured to communicate via BACnet protocol, which is a standard protocol used for building automation and control networks. Optionally, communications may be integrated into BACnet via another communications protocol, such as SIMMSnet protocol, which is available from SIMMS Electronics of Grand Rapids, Mich. SIMMSnet is configured or adapted to facilitate communications between local computer 18, Ethernet switch 26, power control devices 14, motion sensors 16, and an existing BACnet system by utilizing both wired and wireless communications to ensure that information is exchanged efficiently between components.

Figure 15:
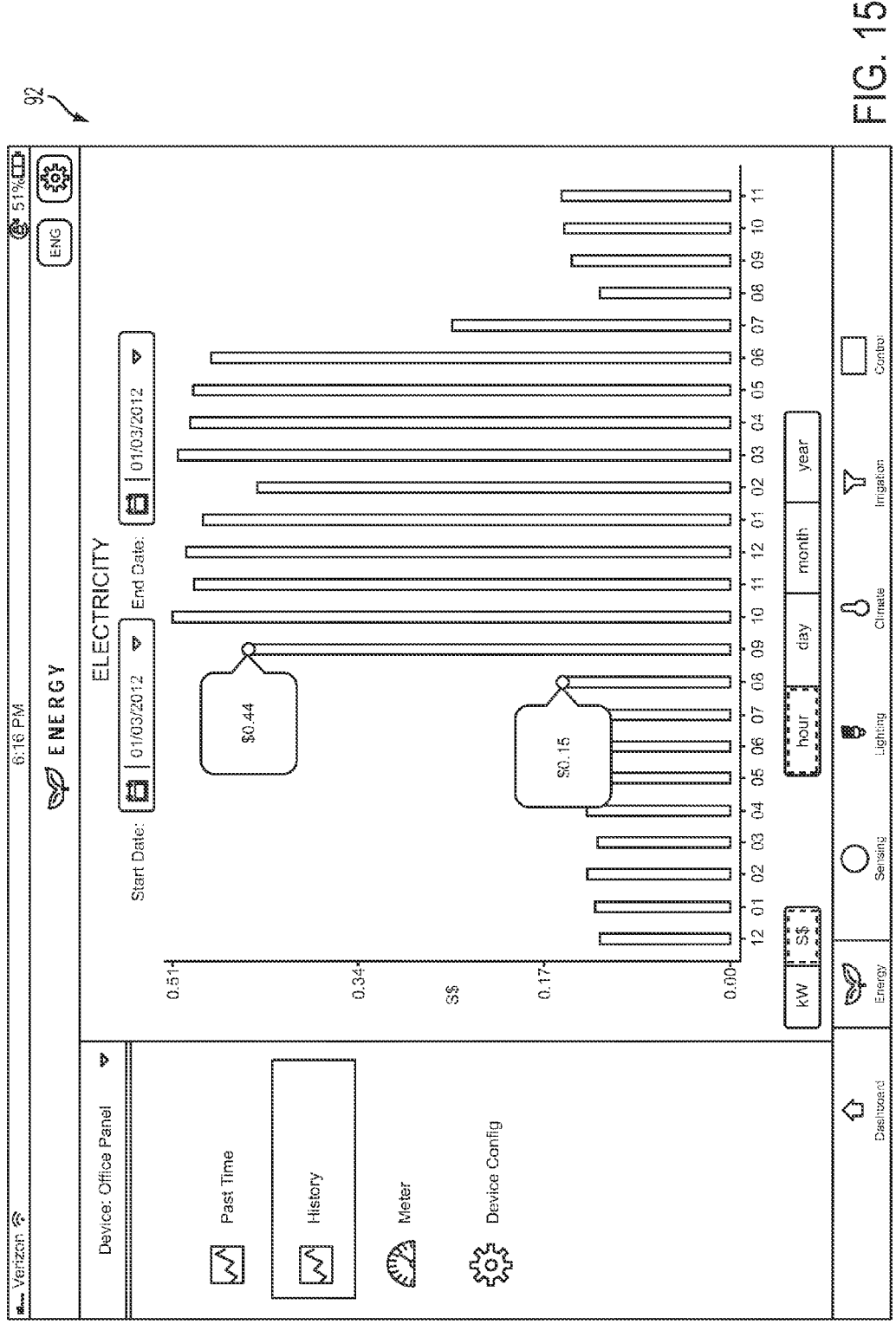
FIG. 15 is a screen image of a computer display showing historical energy consumption in a single circuit on an hourly basis.
Figure 18:
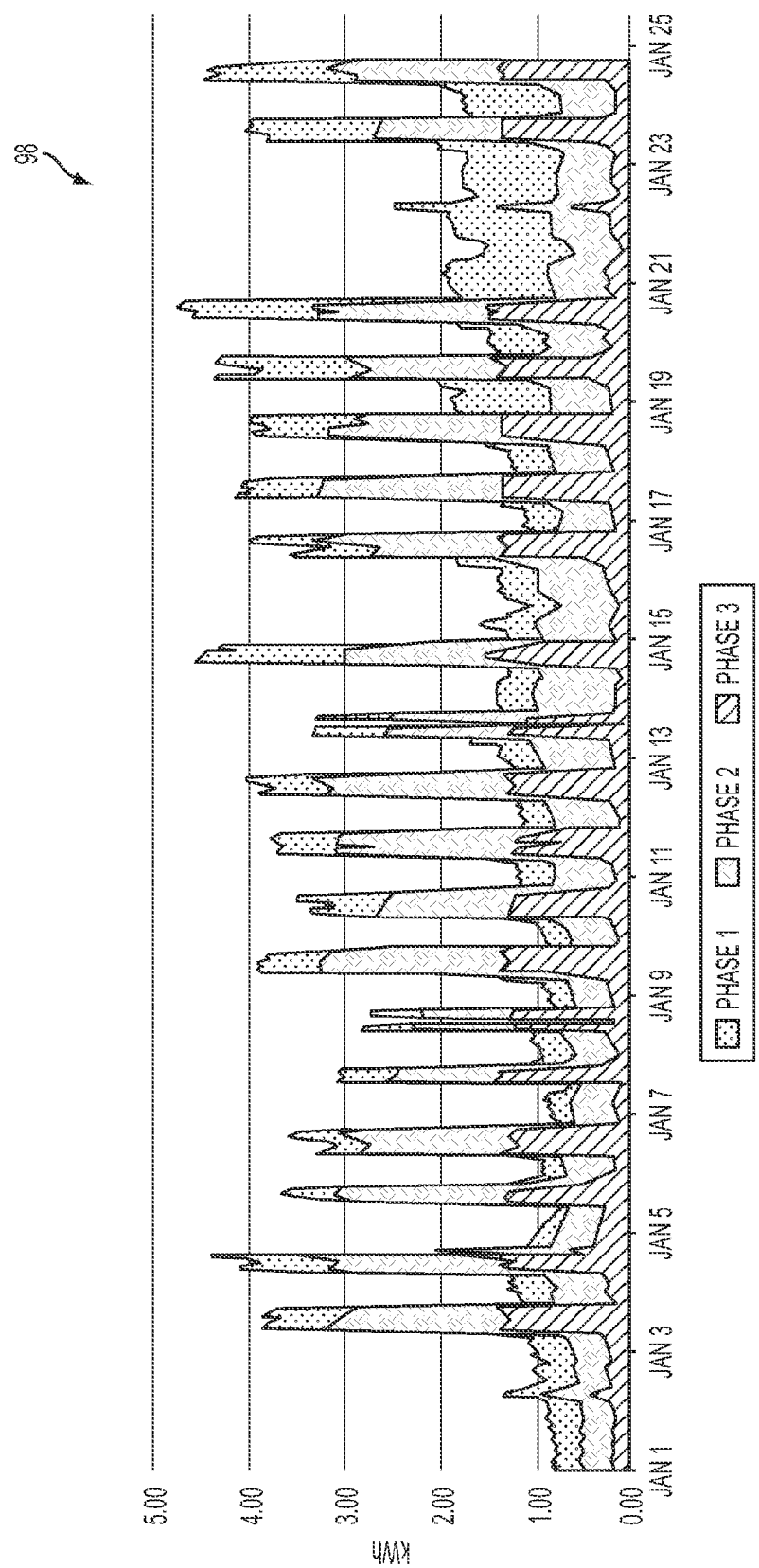
FIG. 18 is a screen image of a chart on a computer display, depicting historical day-by-day of energy consumption in different circuits, as reported by a power control device.

Information displays, such as power consumption graphs (FIGS. 15, 18, and 19) and the like, may be generated by analysis and display software such as the "e6 System" by SIMMS Energy of Grand Rapids, Mich. Data displays themselves, based on data received from power control devices 14, may be integrated into existing BACnet displays, so that a person using local computer 18 can observe and control power consumption along multi-circuit power distribution assemblies 12 along with other energy consumers in the building or premises. It will be appreciated that such displays or user interfaces may be readily customized or adapted according to a particular user's preferences.

Figure 14:
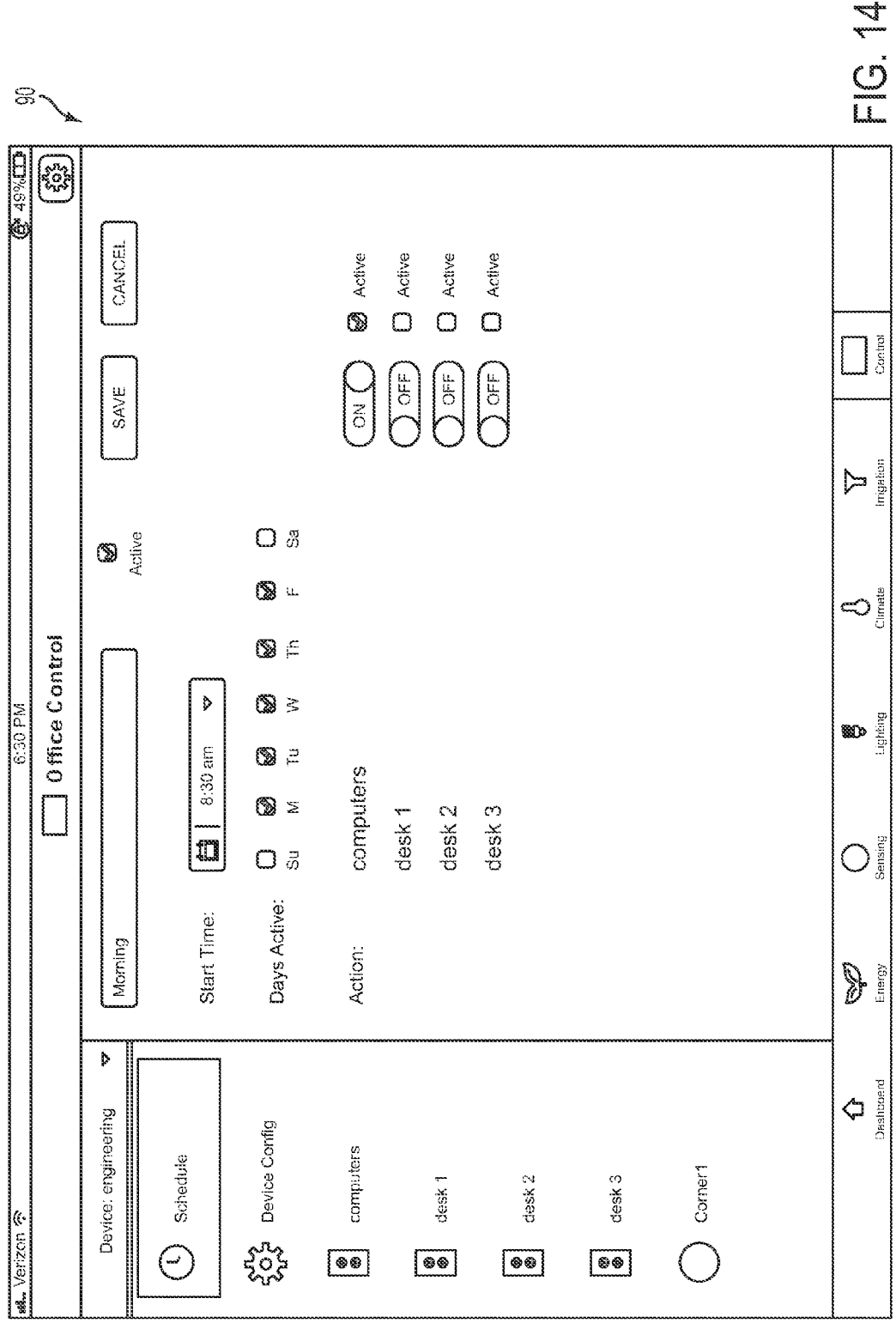
FIG. 14 is a screen image of a computer display used for time-based programming of the power control device.

Referring to FIG. 14, an exemplary user display interface 90 is presented or displayable at local computer 18 (or at a display associated with computer 18) for use in programming power control devices 14. In FIG. 14, display interface 90 is illustrated as showing a power-on time of 8:30 am, Monday through Friday, for an electrical circuit that is associated with computers in a work area that is serviced by one power control device 14, while three other electrical circuits associated with "desk 1", "desk 2", and "desk 3", which are serviced by the power control device 14 in that work area, are currently set to "off" at those days and times. In the illustrated embodiment, once the program input is saved, the power output electrical conductor(s) of the circuit associated with "computers" in the work area will be energized at 8:30 am, Monday through Friday, by closing the associated electrical switch 70 at power control device 14. Another program input would likely be used to de-energize the circuit later in the day.

An hour-by-hour power consumption history display 92 (FIG. 15) may be presented at local computer 18 for use in monitoring electrical power consumption at a given power control device 14, down to a circuit-by-circuit level. Display 92 can be used to readily determine the typical work hours or periods of active energy use during any given day (with hour-by-hour energy consumption shown at display 92 of FIG. 15), and can also display the energy cost over a given period of time. For example, on the display 92 of FIG. 15, the energy consumption from 8 am to 9 am cost about $0.15 for the area monitored, while energy consumption in the same area between 9 am and 10 am cost $0.44. Energy consumption in the area can be observed to taper off quickly between the hours of 6 pm and 7 pm, and also between the hours of 7 pm and 8 pm. Thus, the information presented at display 92 could be used to determine that an appropriate time to de-energize one or more circuits in the monitored work area would be about 7:30 pm, and an appropriate time to re-energize the circuit(s) would be about 8:30 am. Because the energy consumption of the work area monitored by display 92 is about $4.50 to $5.00 during work hours, and about $2.00 to $2.25 during non-work hours, in this example the overall 24-hour energy consumption in the work area can be reduced by about 30% without affecting the availability of electricity during typical work hours.

Figure 16:
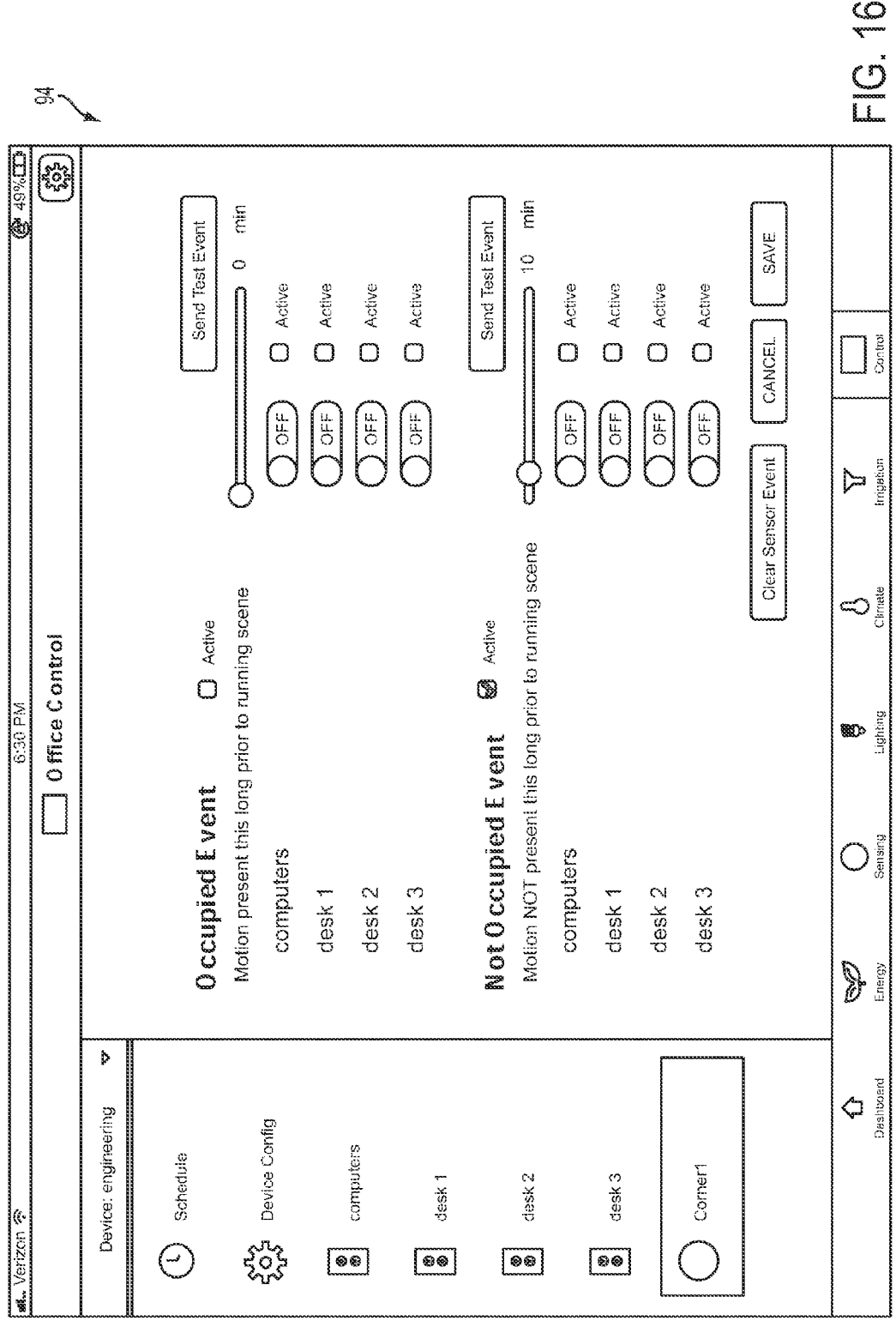
FIG. 16 is a screen image of an occupancy display and control used for selecting which circuits will be energized when a given occupancy sensor detects that an area is occupied.
Figure 17:
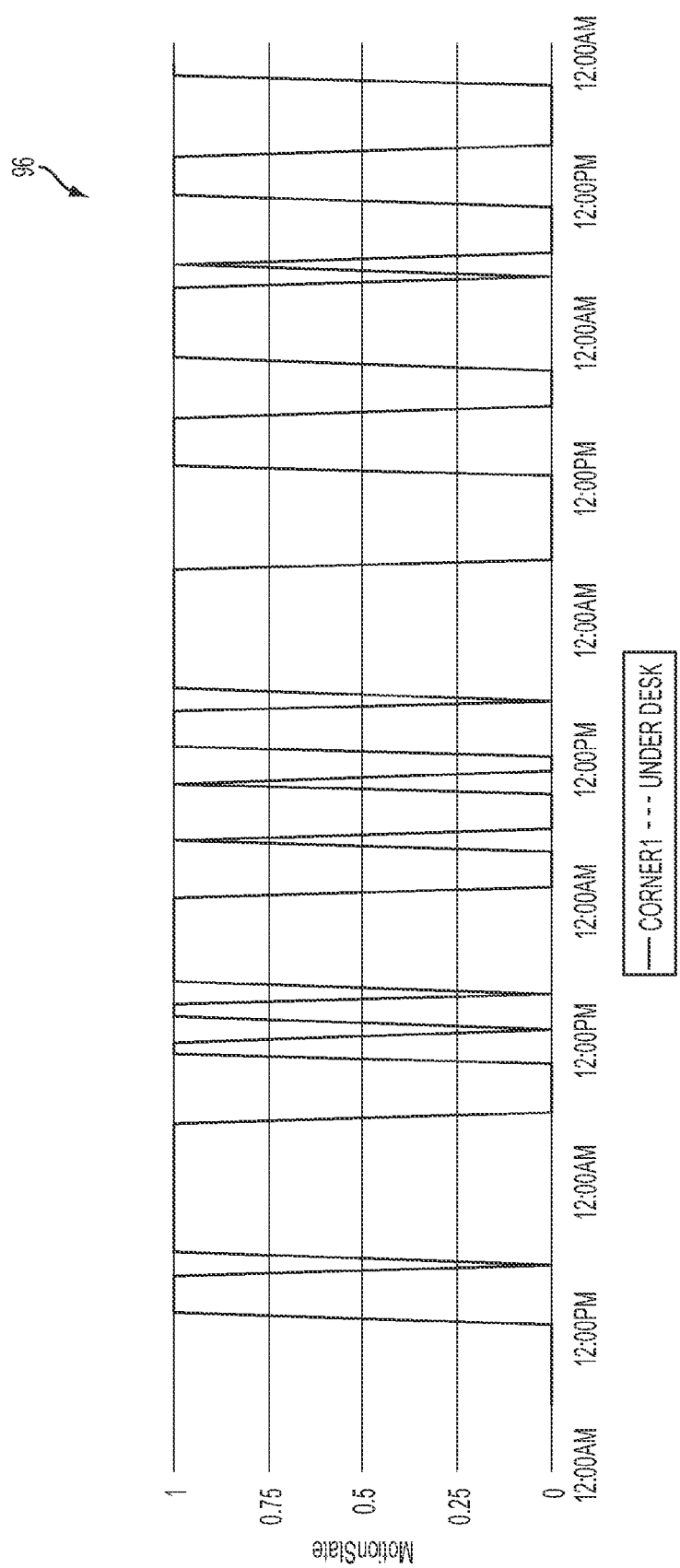
FIG. 17 is a screen image of a chart on a computer display, depicting historical detected occupancy of an area, as reported by an occupancy sensor to a power control device.

In the case of a power control device 14 that is at least partially controlled via occupancy sensors 16, an occupancy display 94 (FIG. 16) may be used to control and display which circuits are to be energized when a given occupancy sensor or sensors 16 detect occupancy of a work area. A historical occupancy screen or display 96 (FIG. 17) may be used to show the times at which a work area is occupied, as detected by occupancy sensors 16, similar to how power consumption display 92 can be used to show typical times of active energy usage, to aid a user in determining which circuits should be activated when occupancy is detected by a particular sensor or sensors 16. Optionally, room temperature, light levels, and other metrics may also be measured, recorded, and shown at display 96 (FIG. 17).

Figure 19:
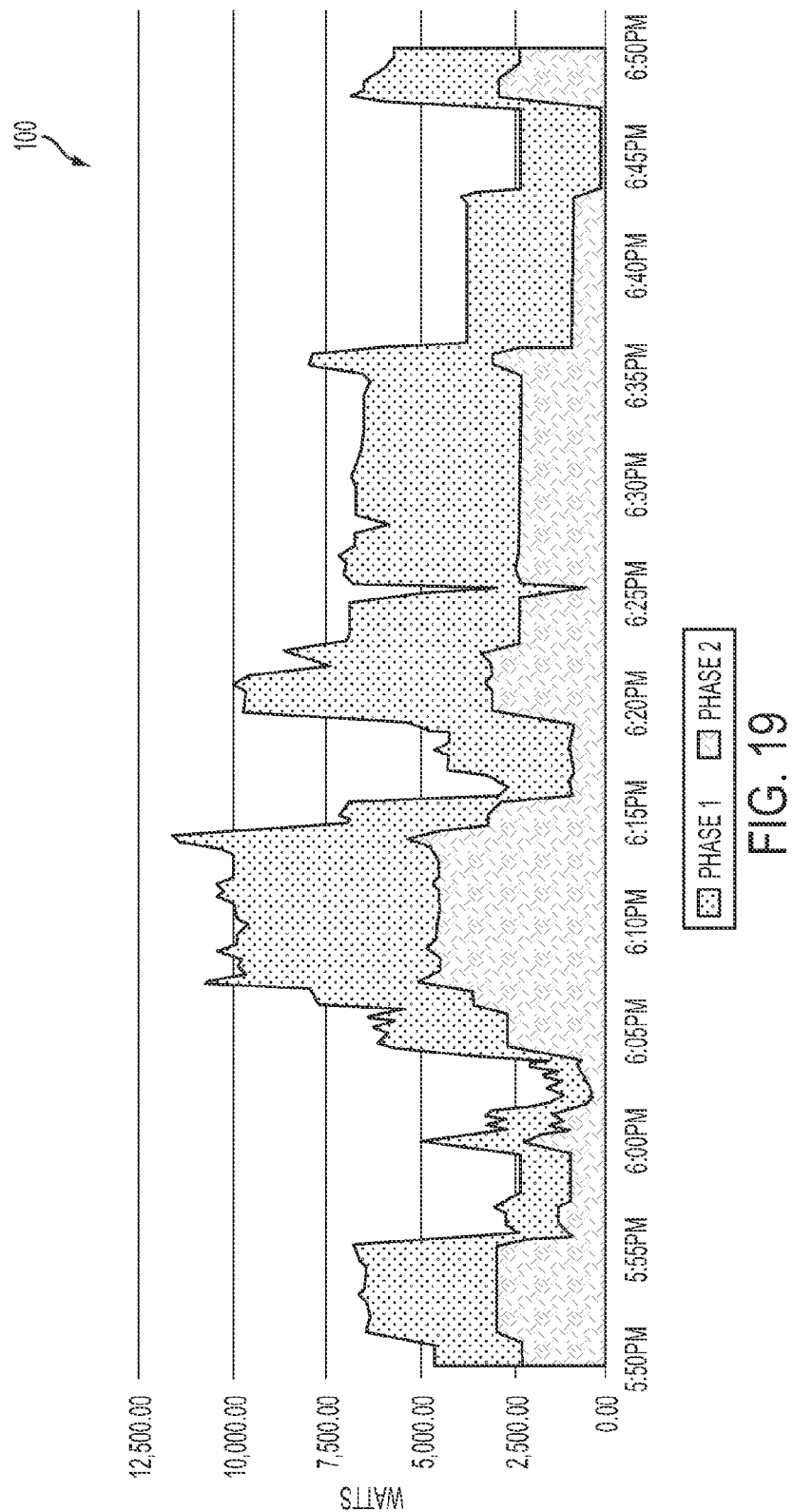
FIG. 19 is a screen image of a chart on a computer display, depicting historical minute-by-minute power consumption in an individual circuit, as reported by a power control device.

For higher-level energy analysis, power consumption displays may include, for example, a historical day-by-day analysis display 98 of energy consumption in each circuit, in terms of kilowatt hours (kWh) and corresponding cost (FIG. 18), or a minute-by-minute power consumption display 100 for an individual circuit (FIG. 19). It is envisioned that historical data may be collected and displayed for substantially any power consumption metric or occupancy metric, and displayed at substantially any resolution such as minute-by-minute, hour-by-hour, day-by-day, week-by-week, month-by-month, season-by-season, year-by-year, etc. This information may be used to optimize the programming of power control devices 14 for energy savings.

Electrical power management system 10 may be used to implement a method of energy control. The wiring installation procedure includes electrically coupling a multi-circuit power infeed to a power control device, which can be accomplished in several different ways that will be described below. The power control device includes multiple electrical switches that are associated with a plurality of electrical infeed conductors of the multi-circuit power infeed. A multi-circuit power output is electrically coupled to the power control device. At least some of the power output conductors are in selective electrical communication with electrical infeed conductors according to the positions of the electrical switches in the power control device. One or more electrical power outlets or other electrical consumers (lighting, for example) are coupled to at least one of the electrical output conductors. Wired or wireless occupancy sensors may be installed in the area served by the power management system, if desired.

Electronic communications are established between local computer 18 and power control device 14, and/or between power control device 14 and occupancy sensors 16. Once communications are established, an occupancy signal may be received by power control device 14 (via an electronic communications module 58) from one or more occupancy sensors 16, or processor 68 may determine that a trigger event (e.g. a programmed time at which a particular circuit should be energized or de-energized). In response to receiving an occupancy signal or detecting a trigger event, the processor 68 closes or opens one or more switches 70 at power control device 14 to thereby electrically energize or de-energize the electrical output conductor(s) associated with the circuit(s).

Figure 12A:
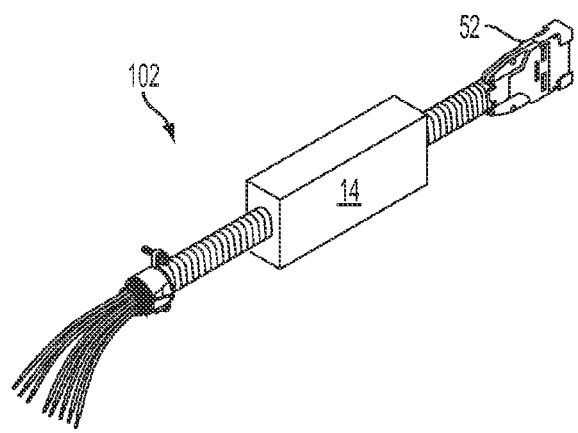
FIGS. 12A-12F are perspective views of different exemplary wiring arrangements that are useful for electrically connecting a power control device to a new or pre-existing wiring arrangement.
Figure 12B:
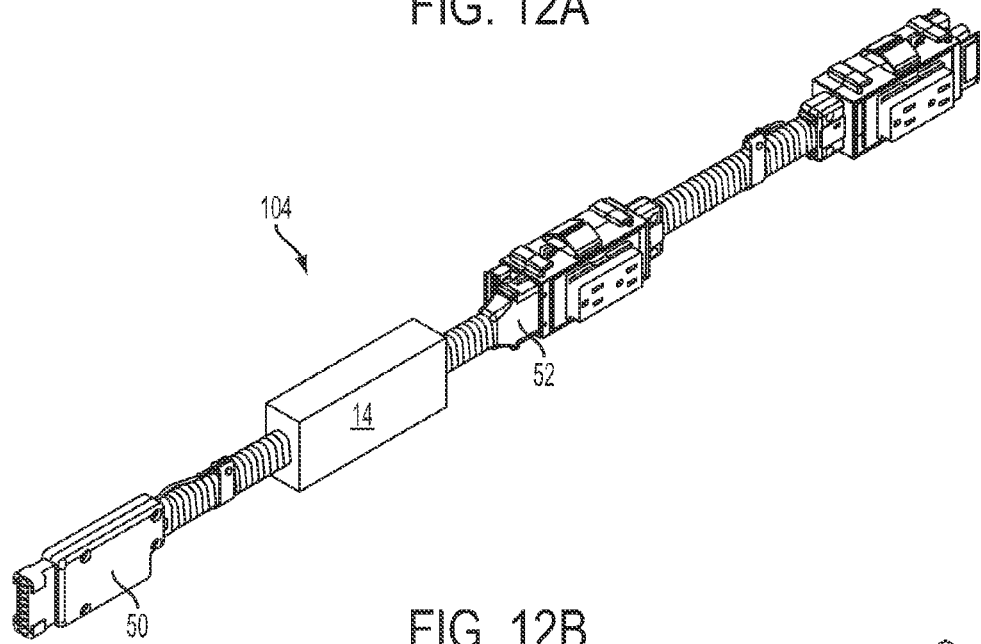
Figure 12C:
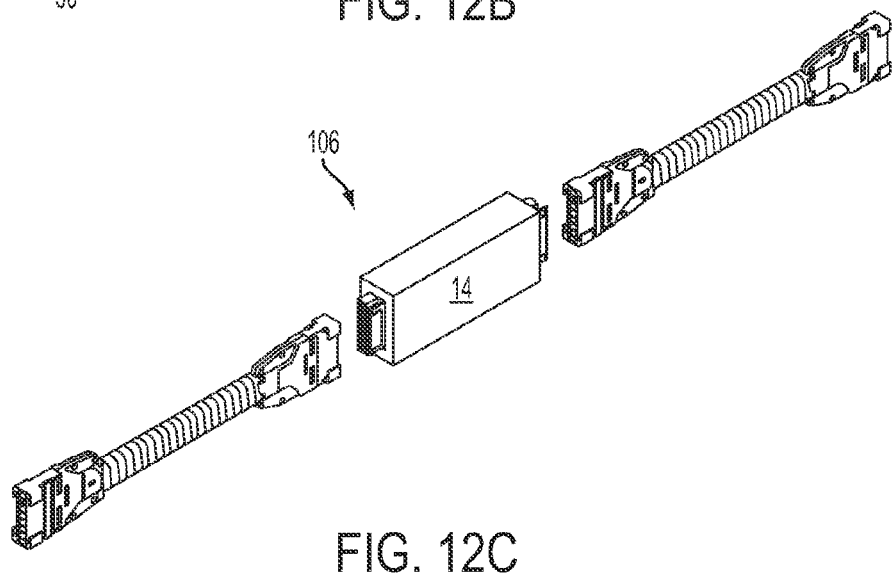
Figure 12D:
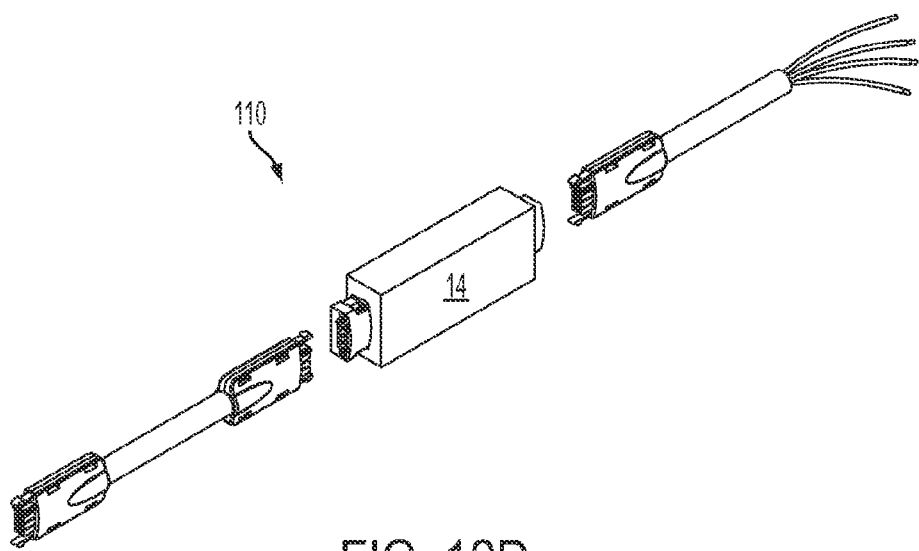
Figure 12E:
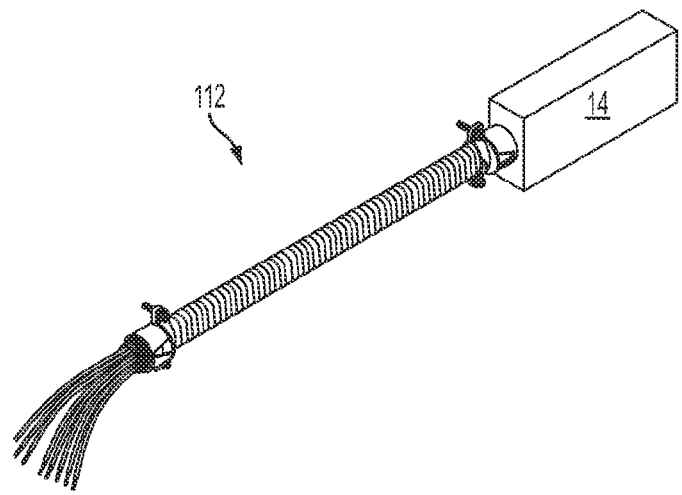
Figure 12F:
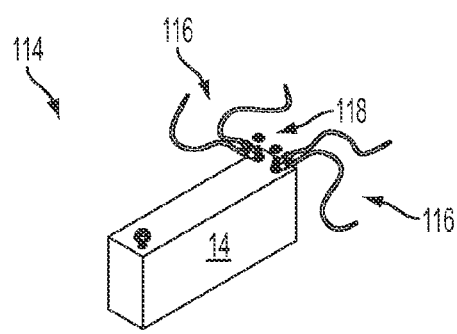

It is envisioned that power control devices 14 may be incorporated or wired into numerous different wiring arrangements for use in office or work areas, homes, or the like, to enable circuit-level control and monitoring of energy consumption in different areas of a building or structure. Options for wiring power control device may include, for example, a hardwired power-infeed arrangement 102 like that of FIG. 12A (also in FIGS. 1 and 2); a connector-based power-infeed arrangement 104 like that of FIG. 12B (also in FIG. 3); a connector-based retrofit arrangement 106 like that of FIG. 12C, in which a power-infeed 108 (FIG. 2) may be removed from an existing installation and replaced by connector-based retrofit 106 simply by plugging electrical connectors; another connector-based retrofit arrangement 110 (FIG. 12D) utilizing different connectors and including exposed conductors for wiring to substantially any other wiring system; a hardwired power-infeed arrangement 112 (FIG. 12E); and a universal installation arrangement 114 (FIG. 12F) that can be used in conjunction with substantially any wiring system by direct-connection of wiring 116 to screw terminals 118 or the like.

Figure 13:
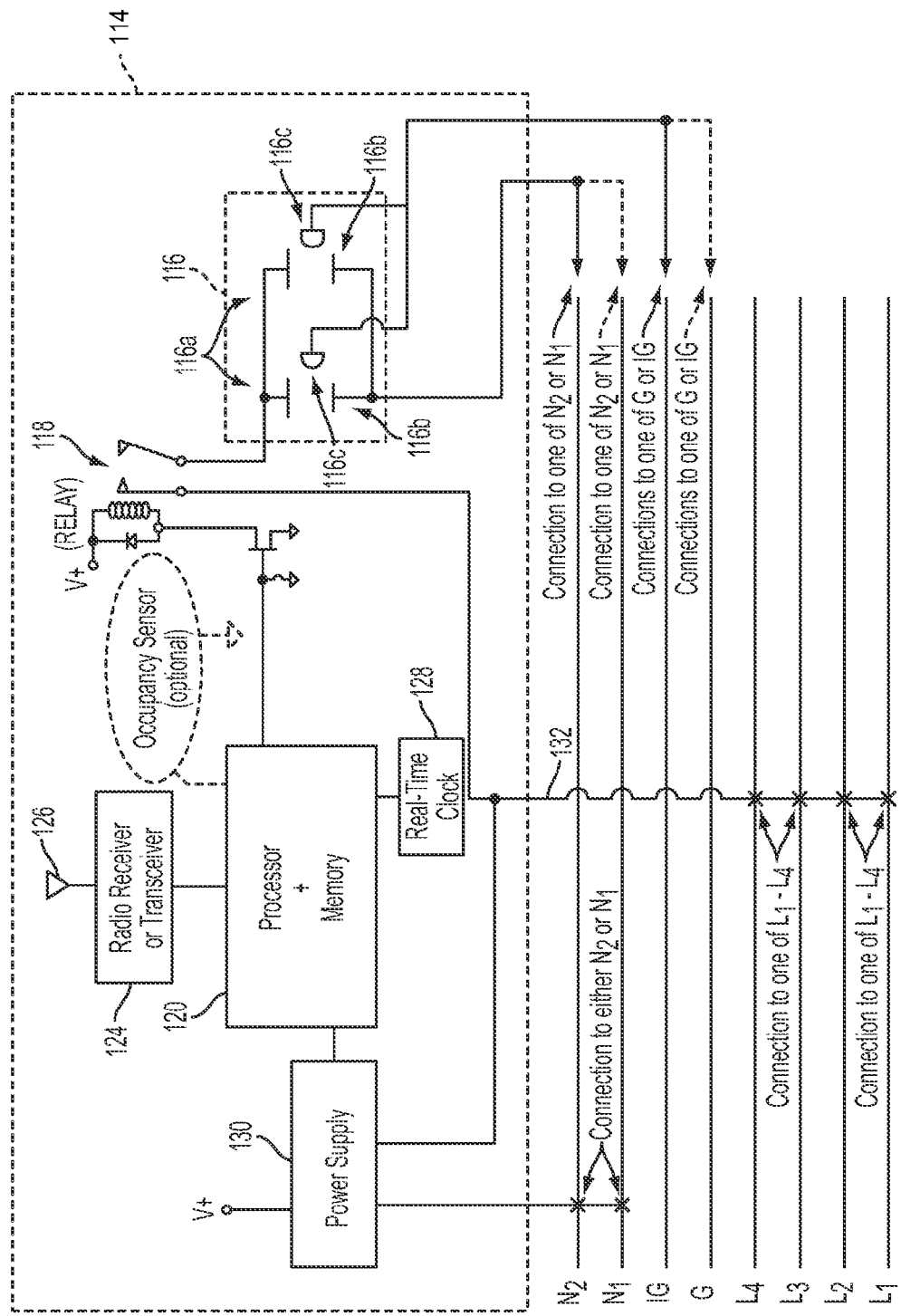
FIG. 13 is a wire diagram of a receptacle-level power control device in accordance with the present invention.

Optionally, and with reference to FIG. 13, a receptacle-level power control device 114 may be implemented in a similar manner as the circuit-level power control device 14, described above, but used for outlet-by-outlet (or consumer-by-consumer) control of electrical consumption in a building or work area, such that multiple receptacle-level power control devices 114 may be used along a single electrical circuit. Receptacle-level power control device 114 is a substantially self-contained unit that includes conventional electrical receptacle contacts 116, which include electrically hot (or "line") contacts 116a, electrically neutral contacts 116b, and electrically grounded contacts 116c. Hot contacts 116a are selectively energized by coupling to (in the illustrated embodiment) one of four hot conductors $L_1$-$L_4$ via a relay switch 118. Relay 118 is activated by a computer processor 120 in response to any one or more of (i) a program stored in memory at processor 120, (ii) a signal received from an optional occupancy sensor 122, and (iii) a signal received from a wireless receiver or communications module 124 having an associated transceiver or receiver antenna 126. Processor 120 may be in communication with a real-time clock 128 for use in running time-based and/or date-based programs for energizing and de-energizing hot contacts 116a at programmed times, for example. A power supply 130 is electrically coupled to any one of the available hot conductors $L_1$-$L_4$ via a hot power conductor 132, and is also coupled to either of two available neutral conductors $N_1$ or $N_2$, so that power supply 130 is supplied with substantially constant electrical power for operating processor 120 and relay 118.

In the illustrated embodiment of FIG. 13, receptacle-level power control device 114 is associated with a four-circuit power supply having four hot conductors $L_1$-$L_4$, two neutral conductors $N_1$ and $N_2$, and two ground conductors G and IG (the latter being an isolated ground), such as may be implemented via the 8-TRAC® electrical distribution assembly available from Byrne Electrical Specialists, Inc. of Rockford, Mich., which is disclosed in commonly-owned U.S. Pat. No. 7,410,379, which is hereby incorporated herein by reference in its entirety. However, it will be appreciated that different numbers of hot, neutral, and ground conductors are equally possible. During the manufacturing and/or the installation of receptacle-level power control device 114, power supply 130 may be coupled to any of the available neutral conductors $N_1$ and $N_2$ and to any of the available hot conductors $L_1$-$L_4$, while the electrically neutral contacts 116b may be electrically coupled to any of the available neutral conductors $N_1$ and $N_2$, and electrically grounded contacts 116c may be electrically coupled to any of the available ground conductors G and IG. The selection of which conductors to electrically couple to power supply 130, hot power conductor 132, electrically neutral contacts 116b, and electrically grounded contacts 116c, may be made according to local electrical codes and the number of other electrical receptacles or electrical loads present along the circuit(s).

Receptacle-level power control device 114 may operate in a similar manner as a lower-functioning power management system, described above. For example, receptacle-level power control device 114 may be configured to actuate relay 118 based on a program received in memory of computer processor 120 (e.g., via a programming signal delivered from a remote computer to processor 120 via communications module 124) and based on a time signal received from real-time clock 128. Optionally, receptacle-level power control device 114 may not be capable of receiving a signal from an occupancy sensor 122, for example, and/or may not be equipped to monitor power consumption at the receptacle. Thus, as with the circuit-level power control device 14, receptacle-level power control device 114 may be configured with various levels of functionality according to cost constraints and functional needs in a building or work area. For example, it is envisioned that the receptacle-level power control device could be equipped with substantially the same communications and data logging hardware and capabilities as the circuit-level power control device 14. Optionally, receptacle-level power control device 114 may be paired with (i.e., controlled via) one of circuit-level power control devices 14 described above, which may communicate via their respective communications modules 30 and 124, so that receptacle-level power control device 114 may be controlled via a wired or wireless network, the Internet, or wireless communications.

Thus, the electrical power management systems and methods of the present invention permit control and monitoring of electrical power consumption on a circuit-by-circuit basis in a building or work area. The power control device is in electrical communication with a multi-circuit power infeed and a multi-circuit power output, each including a plurality of electrical conductors on separate circuits. The power control device can receive and store program instructions from another computer, and can operation substantially autonomously to energize and de-energize circuits based on the program instructions without further input from the other computer. Optionally, the power control device can energize and de-energize individual circuits based on occupancy signals from one or more occupancy sensors, for example. Thus, when a period of non-use is detected or anticipated for a particular area services by the system, the power control device will de-energize one or more of the circuits to limit or prevent unnecessary energy consumption within the system.

Changes and modifications in the specifically-described embodiments may be carried out without departing from the principles of the present invention, which is intended to be limited only by the scope of the appended claims as interpreted according to the principles of patent law including the doctrine of equivalents.

The invention claimed is:

1. An electrical power management system comprising:
a power control device in electrical communication with a multi-circuit power infeed including at least first and second electrical infeed conductors on separate circuits, said power control device comprising:
first and second electrical switches associated with said first and second electrical infeed conductors and operable between an open configuration and a closed configuration;
an electronic communications module; and
a computer processor in communication with said first and second electrical switches and with said electronic communications module, wherein said computer processor is operable to open and close each of said first and second electrical switches independently of one another in response to at least one of (i) an occupancy signal received via said electronic communications module and (ii) a trigger event detected by said computer processor;
wherein said computer processor is further operable to open and close each of said first and second electrical switches independently of one another in response to an occupancy signal received via said electronic communications module, and wherein the occupancy signal is indicative of whether an area is occupied by a person, the occupancy signal being generated by an occupancy detector having a transmitter for generating the occupancy signal, and wherein the transmitter is in communication with said electronic communications module;
a multi-circuit power output including first and second electrical output conductors associated with the separate circuits of the first and second electrical infeed conductors, whereby said first electrical output conductor is in electrical communication with said first electrical infeed conductor when a first of said switches is closed, and said second electrical output conductor is in electrical communication with said second electrical infeed conductor when a second of said switches is closed; and
a plurality of junction blocks each comprising an electrical power outlet configured to receive an electrical plug of an electrical consumer, wherein each electrical power outlet of said plurality of junction blocks is in electrical communication with said first electrical output conductor, such that a first electrical power outlet of a first junction block of said plurality of junction blocks provides electricity to a first electrical consumer when said first electrical switch is closed.

2. The system of claim 1, wherein said power control device further comprises a memory module in communication with said computer processor and configured to store a trigger event detected by said computer processor, said computer processor being operable to open and close said first and second electrical switches independently of one another in response to the trigger event stored in said memory module.

3. The system of claim 2, wherein the trigger event stored in said memory module comprises at least one chosen from a time of day and a day of the week.

4. The system of claim 3, wherein said power control device comprises an internal real-time clock in communication with said computer processor, and wherein said computer processor is operable to open or close at least one of said first and second electrical switches when said computer processor determines that the trigger event time coincides with a current time of day provided by said internal real-time clock.

5. The system of claim 1, wherein said occupancy detector comprises a motion sensor or a heat detector.

6. The system of claim 1, wherein said electronic communications module is in communication with a computer having a display, said electronic communications module configured to receive program instructions from the computer, the program instructions including one or more of the trigger events.

7. The system of claim 6, wherein said power control device is operable to run the program instructions substantially autonomously without further instructions from the computer.

8. An electrical power management system comprising:
a multi-circuit power infeed having at least two electrically hot infeed conductors, at least one electrically neutral infeed conductor, and at least one electrically grounded infeed conductor;
a power control device in electrical communication with said power infeed, said power control device comprising:

an electrical switch associated with each of said electrically hot infeed conductors and operable between an open configuration and a closed configuration;
a memory module;
an electronic communications module; and
a computer processor in communication with each of said electrical switches, said memory module, and said electronic communications module, wherein said computer processor is operable to open and close each of said electrical switches independently of one another in response to at least one of (i) an occupancy signal received via said electronic communications module, and (ii) a trigger event detected by said computer processor;
wherein said computer processor receives an occupancy signal received from said electronic communications module, and wherein the occupancy signal is indicative of whether an area is occupied by a person, the occupancy signal being generated by an occupancy detector having a transmitter for generating the signal;
a multi-circuit power output having at least two electrically hot output conductors, at least one electrically neutral output conductor, and at least one electrically grounded output conductor, said electrical output conductors corresponding respectively to said electrical infeed conductors, wherein each of said at least two electrically hot output conductors is in electrical communication with a corresponding one of said at least two electrically hot infeed conductors when corresponding ones of said electrical switches are in said closed configuration; and
a plurality of junction blocks each comprising an electrical power outlet configured to receive an electrical plug of an electrical consumer, wherein each electrical power outlet of said plurality of junction blocks is in electrical communication with a first of said at least two electrically hot output conductors, such that a first electrical power outlet of a first junction block of said plurality of junction blocks provides electricity to a first electrical consumer when said electrical switch associated with said first electrically hot infeed conductor is closed.

9. The system of claim 8, wherein said memory module is configured to store the trigger event, said computer processor being operable to open and close each of said electrical switches independently of one another in response to the trigger event stored in said memory module.

10. The system of claim 9, wherein the trigger event stored in said memory module comprises at least one chosen from a time of day and a day of the week.

11. The system of claim 10, wherein said power control device comprises an internal real-time clock in communication with said computer processor, and wherein said computer processor is operable to open or close at least one of said electrical switches when said computer processor determines that the trigger event time coincides with a current time of day provided by said internal real-time clock.

12. The system of claim 8, wherein said electronic communications module is in communication with a computer having a display, said electronic communications module configured to receive program instructions from the computer, the program instructions including one or more of the trigger events.

13. The system of claim 12, wherein said power control device is operable to run the program instructions substantially autonomously without further instructions from the computer.

14. The system of claim 8, wherein said electronic communications module is operable to transmit power consumption data corresponding to each circuit.

15. An electrical power management system comprising:
a power infeed including at least first and second electrical infeed conductors disposed in a flexible armored infeed conduit;
a multi-circuit power output including first and second electrical output conductors associated with electrically separate circuits and disposed in a flexible armored output conduit;
a power control device in electrical communication with said multi-circuit power infeed and said multi-circuit power output, said power control device including first and second electrical switches associated with said first and second electrical output conductors and operable between an open configuration and a closed configuration to permit selective electrical coupling of said first and second electrical output conductors to at least one of said first and second electrical infeed conductors;
wherein said power control device also includes a computer processor in communication with each of said electrical switches, and an electronic communications module, wherein said power control device is operable to select between the open and closed configurations in response to at least one of (i) an occupancy signal received via said electronic communications module, and (ii) a trigger event detected by said computer processor;
wherein said computer processor receives an occupancy signal received from said electronic communications module, and wherein the occupancy signal is indicative of whether an area is occupied by a person, the occupancy signal being generated by an occupancy detector having a transmitter for generating the signal;
an plurality of electrical junction blocks positioned along said flexible armored output conduit of said multi-circuit power output; and
a corresponding electrical power outlet positionable at each of said plurality of electrical junction blocks and configured to receive an electrical plug of an electrical consumer, wherein each electrical power outlet of said plurality of electrical junction blocks is in electrical communication with said first electrical output conductor, such that a first electrical power outlet of a first electrical junction block of said plurality of electrical junction blocks provides electricity to a first electrical consumer when said first electrical switch is closed.

16. The system of claim 15, wherein said first electrical power outlet is repositionable at said first electrical junction block so as to be in electrical communication with said second electrical output conductor instead of said first electrical output conductor when said first electrical power outlet is coupled to said first electrical junction block to selectively provide electricity to said first power outlet and said first electrical consumer when said second electrical switch is closed.

17. A method of controlling the distribution of electrical power among a plurality of circuits in an electrical system, said method comprising:
electrically coupling a multi-circuit power infeed to a power control device, the power control device including first and second electrical switches associated with first and second electrical infeed conductors of the multi-circuit power infeed and controlled by a computer processor;

electrically coupling a multi-circuit power output to the power control device, the multi-circuit power output including first and second electrical output conductors that are in selective electrical communication with the first and second electrical infeed conductors according to the positions of the first and second electrical switches;

electrically coupling a plurality of electrical power outlets to one of the first and second electrical output conductors;

storing a trigger event in a memory module of the power control device;

receiving an occupancy signal via an electronic communications module or detecting the trigger event with the computer processor; and in response to said receiving an occupancy signal or detecting the trigger event with the computer processor, selectively closing or opening either or both switches to thereby electrically energize or de-energize the first and second electrical output conductors, wherein said selectively closing or opening either or both switches is performed independently of one another in response to detecting the occurrence of the trigger event stored in the memory module, and wherein the trigger event stored in the memory module comprises at least one chosen from a time of day and a day of the week.

* * * * *